United States Patent
Tatsuta et al.

(10) Patent No.: US 8,447,003 B2
(45) Date of Patent: May 21, 2013

(54) CLOCK SYNCHRONIZATION METHOD FOR USE IN COMMUNICATION SYSTEM FOR TRANSMITTING AT LEAST ONE OF VIDEO DATA AND AUDIO DATA

(75) Inventors: Akihiro Tatsuta, Kyoto (JP); Makoto Funabiki, Osaka (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 862 days.

(21) Appl. No.: 12/593,416

(22) PCT Filed: Mar. 24, 2008

(86) PCT No.: PCT/JP2008/000690
§ 371 (c)(1),
(2), (4) Date: Nov. 10, 2009

(87) PCT Pub. No.: WO2008/129816
PCT Pub. Date: Oct. 30, 2008

(65) Prior Publication Data
US 2010/0061406 A1    Mar. 11, 2010

(30) Foreign Application Priority Data
Mar. 28, 2007    (JP) ................................. 2007-083654

(51) Int. Cl.
*H04L 7/00*    (2006.01)
(52) U.S. Cl.
USPC .......... 375/354; 375/215; 375/355; 375/371; 375/373; 375/362; 375/369; 375/376

(58) Field of Classification Search
USPC ................. 375/215, 354, 355, 371, 373, 362, 375/369, 376
See application file for complete search history.

(56) References Cited

U.S. PATENT DOCUMENTS

| | | | |
|---|---|---|---|
| 5,768,326 A | 6/1998 | Koshiro et al. | |
| 6,037,814 A | 3/2000 | Hirakawa | |

(Continued)

FOREIGN PATENT DOCUMENTS

| | | |
|---|---|---|
| JP | 8-288880 | 11/1996 |
| JP | 10-41812 | 2/1998 |

(Continued)

OTHER PUBLICATIONS

International Search Report issued Jun. 24, 2008 in International (PCT) Application No. PCT/JP2008/000690.

(Continued)

*Primary Examiner* — Kenneth Lam
(74) *Attorney, Agent, or Firm* — Wenderoth, Lind & Ponack, L.L.P.

(57) ABSTRACT

A source device counts a clock CLKpixel for pixel data using a transmitting counter, adds a counted value Csource(t) of the transmitting counter at a timing of transmitting a video packet Pvideo to the sink device to a header part of the video packet Pvideo as a time stamp value Csource(t), and transmits the video packet Pvideo to the sink device. The sink device receives the video packet Pvideo, extracts the time stamp value Csource(t) from the header part of the video packet Pvideo, generates a fixed reference clock CLKref based on the counted value Csource(t) of the transmitting counter using a first PLL, circuit, and generates the clock CLKpixel for the pixel data of the source device based on the reference clock CLKref using a second PLL circuit.

24 Claims, 11 Drawing Sheets

U.S. PATENT DOCUMENTS

| | | | |
|---|---|---|---|
| 6,072,832 A * | 6/2000 | Katto | 375/240.28 |
| 6,175,385 B1 | 1/2001 | Kohiyama et al. | |
| 6,636,575 B1 | 10/2003 | Ott | |
| 6,671,343 B1 | 12/2003 | Ito | |
| 6,944,249 B2 * | 9/2005 | Hartman et al. | 375/373 |
| 7,418,011 B2 * | 8/2008 | Holborow | 370/503 |
| 2002/0101946 A1 * | 8/2002 | Hartman et al. | 375/376 |
| 2003/0058961 A1 | 3/2003 | Fling et al. | |
| 2005/0175040 A1 * | 8/2005 | Holborow | 370/509 |
| 2005/0190872 A1 * | 9/2005 | Seong et al. | 375/354 |
| 2007/0081563 A1 * | 4/2007 | Seo et al. | 370/542 |
| 2008/0114890 A1 * | 5/2008 | Kurihara et al. | 709/231 |
| 2008/0298532 A1 * | 12/2008 | Wang | 375/376 |

FOREIGN PATENT DOCUMENTS

| | | |
|---|---|---|
| JP | 11-17532 | 1/1999 |
| JP | 2000-101560 | 4/2000 |
| JP | 2004-248123 | 9/2004 |

OTHER PUBLICATIONS

International Preliminary Report on Patentability issued Oct. 29, 2009 in International (PCT) Application No. PCT/JP2008/000690.

* cited by examiner

CLOCK SYNCHRONIZATION METHOD FOR USE IN COMMUNICATION SYSTEM FOR TRANSMITTING AT LEAST ONE OF VIDEO DATA AND AUDIO DATA

TECHNICAL FIELD

The present invention relates to a communication system for transmitting video and audio data (referred to as AV data hereinafter) between audio-visual devices (referred to as AV devices hereinafter), and a clock synchronization method for the same communication system. In particular, the present invention relates to a communication system for transmitting uncompressed video data and audio data in a form of packets, and a clock synchronization method for the same communication system.

BACKGROUND ART

There has been specified an MPEG2 System Standard (ISO/IEC13818-1) for packetizing the AV data, inserting calibration information (time stamp) on a reference clock into the packets, and transmitting the packets. A transport stream according to this MPEG2 System Standard is transmitted with calibration information on the reference clock such as a PCR (Program Clock Reference).

FIG. 12 is a block diagram showing a configuration of a communication system using a clock synchronization method according to a prior art, and in particular showing a clock synchronization method for a transport stream. Referring to FIG. 12, there will be described an operation according to the clock synchronization method for the transport stream. Referring to FIG. 12, the communication system is configured to include a transmitter device 71 and a receiver device 74 connected to each other via a communication line 70. The transmitter device 71 includes a PCR counter 73, and the receiver device 74 includes a PCR packet detection part 75 and a clock synchronizing part 76.

The configuration of the communication system, which uses the clock synchronization method for the transport stream and is configured as mentioned above, and an operation of the same communication system will be described below.

In addition to video packets and audio packets, the transmitter device 71 generates PCR packets periodically, and transmits the video packets, the audio packets and the PCR packets to the receiver device 74 via the communication line 70. A counted value (referred to as a PCR value hereinafter) of the PCR counter 73, which counts a transmitting clock 72, is set to each of the PCR packets. In the receiver device 74, the PCR packet detection part 75 detects the PCR packets included in the packets transmitted from the transmitter device 71, and outputs a PCR value to the clock synchronizing part 76. The clock synchronizing part 76 is configured to include a phase-locked loop (referred to as a PLL hereinafter) circuit, compares the PCR value outputted from the PCR packet detection part 75 with the PCR value counted based on a receiving clock 77, and controls the receiving clock 77 so that a difference between the both of the PCR values is smaller. By using the clock synchronization method as described above, the receiver device 74 can obtain clock signals synchronized with the transmitter device 71.

It is to be noted that Patent Documents 1 and 2, for example, show clock synchronizing circuits.

Patent Document 1: Japanese patent laid-open publication No. JP-2004-248123-A.

Patent Document 2: Japanese patent laid-open publication No. JP-2000-101560-A.

DISCLOSURE OF THE INVENTION

Problems to be Solved by the Invention

However, the clock synchronization method for the transport stream using the PCR has the following problems. Each of the transmitting clock 72 and the receiving clock 77 has a fixed clock frequency (27 MHz). Accordingly, in case of a clock such as a clock for pixel data in uncompressed video, the clock frequency changes in a wide range from several tens of megahertz to several hundreds of megahertz depending on a screen size of a television and image quality of an image to be displayed, and therefore, there is such a problem that a voltage-controlled crystal oscillator (referred to as a VCXO hereinafter) employed in the PLL circuit of the clock synchronizing part 76 should be replaced depending on the clock frequency. In addition, when a voltage-controlled oscillator (referred to as a VCO hereinafter) is employed in stead of the VCXO, there is such a problem that time stamp transmission timings should be set more frequently as the clock frequency is higher.

It is an object of the present invention to provide a communication system and a clock synchronization method for the same communication system capable of solving the above-stated problems, and capable of synchronizing clocks between electronic devices even when a frequency of a clock such as a clock for pixel data in uncompressed video data or a clock for audio in audio data changes in a communication system for transmitting AV data between electronic devices such as AV devices in the form of packets.

Means for Solving the Problems

According to a first aspect of the present invention, there is provided a communication system including a source device and a sink device connected to each other via a communication line. The source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device. The sink device receives the video packet Pvideo, extracts the time stamp value Csource(t) from the header part of the video packet Pvideo, generates a fixed reference clock CLKref with a predetermined first frequency division parameter based on the counted value Csource(t) of the transmitting counter using a first PLL circuit, and generates the clock CLKpixel for the pixel data of the source device with a predetermined second frequency division parameter based on the reference clock CLKref using a second PLL circuit.

In the above-mentioned communication system, the source device transmits information Fpixel on a clock frequency for the pixel data to the sink device, and the sink device sets the first frequency division parameter for the first PLL circuit and the second frequency division parameter for the second PLL circuit based on the information Fpixel on the clock frequency for the pixel data.

In addition, in the above-mentioned communication system, the first PLL circuit includes first multiplier means, subtracter means, filter means, D/A converter means, D/A converter means, a voltage-controlled crystal oscillator, a receiving counter, and second multiplier means. The first multiplier means multiplies the counted value Csource(t) of the transmitting counter by a predetermined first multiplier factor, and outputs a signal of a multiplication result. The subtracter means calculates a differential value between the signal of the multiplication result outputted from the first multiplier means and a signal of a multiplication result outputted from second multiplier means, and outputs a differential signal representing the differential value. The filter means smoothes the differential signal outputted from the subtracter means, and outputs a smoothed differential signal. The D/A converter means converts the smoothed differential signal outputted from the filter means into an analog signal. The voltage-controlled crystal oscillator is controlled by the analog signal outputted from the D/A converter means, and the voltage-controlled crystal oscillator generates and outputs the reference clock CLKref. The receiving counter counts the reference clock CLKref outputted from the voltage-controlled crystal oscillator, and outputs a signal of a counted value. The second multiplier means multiplies the signal of the counted value outputted from the receiving counter by a predetermined second multiplier factor, and outputs the signal of the multiplication result to the subtracter means.

Further, in the above-mentioned communication system, the second PLL circuit includes a first frequency divider for dividing a frequency of an inputted reference clock CLKref by a predetermined first division ratio, and outputting a first frequency-divided clock, a phase comparator for comparing a phase of the first frequency-divided clock outputted from the first frequency divider with a phase of a second frequency-divided clock outputted from a second frequency divider, and outputting an error signal of a phase comparison result, a low-pass filter for smoothing the error signal outputted from the phase comparator, and outputting a smoothed error signal, a voltage-controlled oscillator controlled by the smoothed error signal outputted from the low-pass filter, the voltage-controlled oscillator generating an oscillating signal and outputting the oscillating signal as the clock CLKpixel for the pixel data, and the second frequency divider for dividing a frequency of the clock CLKpixel for the pixel data outputted from the voltage-controlled oscillator by a predetermined second division ratio, and outputting the second frequency-divided clock.

According to a second aspect of the present invention, there is provided a communication system including a source device and a sink device connected to each other via a communication line. The source device counts a clock CLKaudio for audio data using a transmitting counter, adds a counted value Csource(t) of the transmitting counter at a timing of transmitting an audio packet Paudio to the sink device, to a header part of the audio packet Pvideo as a time stamp value, and transmits the audio packet Paudio to the sink device. The sink device receives the audio packet Paudio, extracts the time stamp value Csource(t) from the header part of the audio packet Paudio, generates a fixed reference clock CLKref based on the time stamp value Csource(t) using a first PLL circuit, and generates the clock CLKaudio for the audio data of the source device based on the reference clock CLKref using a second PLL circuit.

In the above-mentioned communication system, the source device transmits information Faudio on a clock frequency for the audio data to the sink device, and the sink device sets a first frequency division parameter for the first PLL circuit and a second frequency division parameter for the second PLL circuit based on the information Faudio on the clock frequency for the audio data.

According to a third aspect of the present invention, there is provided a communication system including a source device and a sink device connected to each other via a communication line. The source device counts a clock CLKpixel for pixel data using a transmitting counter, adds a counted value Csource(t) of the transmitting counter at a timing of transmitting a mixture packet Pav including video data and audio data to the sink device, to a header part of the mixture packet Pav as a time stamp value, and transmits the packet Pav to the sink device. The sink device receives the mixture packet Pav, extracts the time stamp value Csource(t) from the header part of the mixture packet Pav, generates a fixed reference clock CLKref based on the time stamp value Csource(t) using a first PLL circuit, generates the clock CLKpixel for the pixel data of the source device based on the reference clock CLKref using a second PLL circuit, and generates the reference clock CLKaudio for the audio data of the source device based on the reference clock CLKref2 using a third PLL circuit.

According to a fourth aspect of the present invention, there is provided a communication system including a source device and a sink device connected to each other via a communication line. The source device counts a clock CLKpixel for pixel data using a first transmitting counter, counts a reference clock CLKaudio for audio data using a second transmitting counter, adds a counted value Csource1($t$) of the first transmitting counter and a counted value Csource2($t$) of the second transmitting counter at a timing of transmitting a mixture packet Pav including video data and audio data to the sink device, to a header part of the mixture packet Pav as time stamp values, and transmits the packet Pav to the sink device. The sink device receives the mixture packet Pav, extracts the time stamp value Csource1($t$) and the time stamp value Csource2($t$) from the header part of the mixture packet Pav, generates a fixed reference clock CLKref1 based on the time stamp value Csource1($t$) using a first PLL circuit, generates the clock CLKpixel for the pixel data of the source device based on the reference clock CLKref1 using a second PLL circuit, generates a fixed reference clock CLKref2 based on the time stamp value Csource2($t$) using a fourth PLL circuit, and generates the reference clock CLKaudio for the audio data of the source device based on the reference clock CLKref2 using a third PLL circuit.

According to a fifth aspect of the present invention, there is provided a clock synchronization method for a communication system including a source device and a sink device connected to each other via a communication line. The source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device. The sink device receives the video packet Pvideo, extracts the time stamp value Csource(t) from the header part of the video packet Pvideo, generates a fixed reference clock CLKref with a predetermined first frequency division parameter based on the counted value Csource(t) of the transmitting counter using a first PLL circuit, and generates the clock CLKpixel for the pixel data of the source device with a predetermined second frequency division parameter based on the reference clock CLKref using a second PLL circuit.

In the above-mentioned clock synchronization method for the communication system, the source device transmits information Fpixel on a clock frequency for the pixel data to the sink device, and the sink device sets the first frequency division parameter for the first PLL circuit and the second frequency division parameter for the second PLL circuit based on the information Fpixel on the clock frequency for the pixel data.

In addition, in the above-mentioned clock synchronization method for the communication system, the first PLL circuit operates as follows. Using first multiplier means, the first PLL circuit multiplies the counted value Csource(t) of the transmitting counter by a predetermined first multiplier factor, and outputs a signal of a multiplication result, using subtracter means, calculates a differential value between the signal of the multiplication result outputted from the first multiplier means and a signal of a multiplication result outputted from second multiplier means, and outputs a differential signal representing the differential value, and using filter means, smoothes the differential signal outputted from the subtracter means, and outputs a smoothed differential signal. Using D/A converter means, the first PLL circuit converts the smoothed differential signal outputted from the filter means into an analog signal, using a voltage-controlled crystal oscillator controlled by the analog signal outputted from the D/A converter means, generates and outputs the reference clock CLKref. Using a receiving counter, the first PLL circuit counts the reference clock CLKref outputted from the voltage-controlled crystal oscillator, and outputs a signal of a counted value, and using the second multiplier means, multiplies the signal of the counted value outputted from the receiving counter by a predetermined second multiplier factor, and outputs the signal of the multiplication result to the subtracter means.

Further, in the above-mentioned clock synchronization method for the communication system, the second PLL circuit operates as follows. Using a first frequency divider, the second PLL circuit divides a frequency of an inputted reference clock CLKref by a predetermined first division ratio, and outputs a first frequency-divided clock, using a phase comparator, compares a phase of the first frequency-divided clock outputted from the first frequency divider with a phase of a second frequency-divided clock outputted from a second frequency divider, and outputs an error signal of a phase comparison result. Using a low-pass filter, the second PLL circuit smoothes the error signal outputted from the phase comparator, and outputs a smoothed error signal, using a voltage-controlled oscillator controlled by the smoothed error signal outputted from the low-pass filter, generates an oscillating signal and outputs the oscillating signal as the clock CLKpixel for the pixel data, and using the second frequency divider, divides a frequency of the clock CLKpixel for the pixel data outputted from the voltage-controlled oscillator by a predetermined second division ratio, and outputs the second frequency-divided clock.

According to a sixth aspect of the present invention, there is provided a clock synchronization method for a communication system including a source device and a sink device connected to each other via a communication line. The source device counts a clock CLKaudio for audio data using a transmitting counter, adds a counted value Csource(t) of the transmitting counter at a timing of transmitting an audio packet Paudio to the sink device, to a header part of the audio packet Pvideo as a time stamp value, and transmits the audio packet Paudio to the sink device. The sink device receives the audio packet Paudio, extracts the time stamp value Csource(t) from the header part of the audio packet Paudio, generates a fixed reference clock CLKref based on the time stamp value Csource(t) using a first PLL circuit, and generates the clock CLKaudio for the audio data of the source device based on the reference clock CLKref using a second PLL circuit.

In the above-mentioned clock synchronization method for the communication system, the source device transmits information Faudio on a clock frequency for the audio data to the sink device, and the sink device sets a first frequency division parameter for the first PLL circuit and a second frequency division parameter for the second PLL circuit based on the information Faudio on the clock frequency for the audio data.

According to a seventh aspect of the present invention, there is provided a clock synchronization method for a communication system including a source device and a sink device connected to each other via a communication line. The source device counts a clock CLKpixel for pixel data using a transmitting counter, adds a counted value Csource(t) of the transmitting counter at a timing of transmitting a mixture packet Pav including video data and audio data to the sink device, to a header part of the mixture packet Pav as a time stamp value, and transmits the packet Pav to the sink device. The sink device receives the mixture packet Pav, extracts the time stamp value Csource(t) from the header part of the mixture packet Pav, generates a fixed reference clock CLKref based on the time stamp value Csource(t) using a first PLL circuit, generates the clock CLKpixel for the pixel data of the source device based on the reference clock CLKref using a second PLL circuit, and generates the reference clock CLKaudio for the audio data of the source device based on the reference clock CLKref2 using a third PLL circuit.

According to a eighth aspect of the present invention, there is provided a clock synchronization method for a communication system including a source device and a sink device connected to each other via a communication line. The source device counts a clock CLKpixel for pixel data using a first transmitting counter, counts a reference clock CLKaudio for audio data using a second transmitting counter, adds a counted value Csource1($t$) of the first transmitting counter and a counted value Csource2($t$) of the second transmitting counter at a timing of transmitting a mixture packet Pav including video data and audio data to the sink device, to a header part of the mixture packet Pav as time stamp values, and transmits the packet Pav to the sink device. The sink device receives the mixture packet Pav, extracts the time stamp value Csource 1($t$) and the time stamp value Csource2($t$) from the header part of the mixture packet Pav, generates a fixed reference clock CLKref1 based on the time stamp value Csource1($t$) using a first PLL circuit, generates the clock CLKpixel for the pixel data of the source device based on the reference clock CLKref1 using a second PLL circuit, generates a fixed reference clock CLKref2 based on the time stamp value Csource2($t$) using a fourth PLL circuit, and generates the reference clock CLKaudio for the audio data of the source device based on the reference clock CLKref2 using a third PLL circuit.

According to a ninth aspect of the present invention, there is provided a communication system including a source device and a sink device connected to each other via a communication line. The source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device. The sink device receives the video packet Pvideo, extracts the time stamp value Csource(t) from the header part of the video packet Pvideo, generates a fixed reference clock CLKref based on the counted value Csource(t) of the transmitting counter and the clock CLKpixel for the pixel data generated by a second PLL circuit using a first PLL circuit, and generates the clock CLKpixel for the pixel data of the source device with a predetermined second frequency division parameter based on the reference clock CLKref using the second PLL circuit.

In the above-mentioned communication system, the source device transmits information Fpixel on a clock frequency for the pixel data to the sink device, and the sink device sets the second frequency division parameter for the second PLL circuit based on the information Fpixel on the clock frequency for the pixel data.

In addition, in the above-mentioned communication system, the first PLL circuit includes subtracter means for calculating a differential value between the counted value Csource(t) of the transmitting counter and a signal outputted from a receiving counter, and outputting a differential signal representing the differential value, filter means for smoothing the differential signal outputted from the subtracter means, and outputting a smoothed differential signal, D/A converter means for converting the smoothed differential signal outputted from the filter means into an analog signal, a voltage-controlled crystal oscillator controlled by the analog signal outputted from the D/A, converter means, the voltage-controlled crystal oscillator generating and outputting the reference clock CLKref, and the receiving counter for counting the inputted clock CLKpixel for the pixel data, and outputting a signal of a counted value.

Further, in the above-mentioned communication system, the second PLL circuit includes a first frequency divider for dividing a frequency of an inputted reference clock CLKref by a predetermined first division ratio, and outputting a first frequency-divided clock, a phase comparator for comparing a phase of the first frequency-divided clock outputted from the first frequency divider with a phase of a second frequency-divided dock outputted from a second frequency divider, and outputting an error signal of a phase comparison result, a low-pass filter for smoothing the error signal outputted from the phase comparator, and outputting a smoothed error signal, a voltage-controlled oscillator controlled by the smoothed error signal outputted from the low-pass filter, the voltage-controlled oscillator generating an oscillating signal and outputting the oscillating signal as the clock CLKpixel for the pixel data, and the second frequency divider for dividing a frequency of the clock CLKpixel for the pixel data outputted from the voltage-controlled oscillator by a predetermined second division ratio, and outputting the second frequency-divided clock.

According to a tenth aspect of the present invention, there is provided a clock synchronization method for a communication system including a source device and a sink device connected to each other via a communication line. The source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device. The sink device receives the video packet Pvideo, extracts the time stamp value Csource(t) from the header part of the video packet Pvideo, generates a fixed reference clock CLKref based on the counted value Csource(t) of the transmitting counter and the clock CLKpixel for the pixel data generated by a second PLL circuit using a first PLL circuit, and generates the clock CLKpixel for the pixel data of the source device with a predetermined second frequency division parameter based on the reference clock CLKref using the second PLL circuit.

In the above-mentioned clock synchronization method for the communication system, the source device transmits information Fpixel on a clock frequency for the pixel data to the sink device, and the sink device sets the second frequency division parameter for the second PLL circuit based on the information Fpixel on the clock frequency for the pixel data.

In addition, in the above-mentioned clock synchronization method for the communication, system, the first PLL circuit operates as follows. Using subtracter means, the first PLL circuit calculates a differential value between the counted value Csource(t) of the transmitting counter and a signal outputted from a receiving counter, and outputs a differential signal representing the differential value, using filter means, smoothes the differential signal outputted from the subtracter means, and outputs a smoothed differential signal, and using D/A converter means, converts the smoothed differential signal outputted from the filter means into an analog signal. Using a voltage-controlled crystal oscillator controlled by the analog signal outputted from the D/A converter means, the first PLL circuit generates and outputs the reference clock CLKref, and using the receiving counter, counts the inputted clock CLKpixel for the pixel data, and outputs a signal of a counted value.

Further, in the above-mentioned clock synchronization method for the communication system the second PLL circuit operates as follows. Using a first frequency divider, the second PLL circuit divides a frequency of an inputted reference clock CLKref by a predetermined first division ratio, and outputs a first frequency-divided clock, and using a phase comparator, compares a phase of the first frequency-divided clock outputted from the first frequency divider with a phase of a second frequency-divided clock outputted from a second frequency divider, and outputs an error signal of a phase comparison result. Using a low-pass filter, the second PLL circuit smoothes the error signal outputted from the phase comparator, and outputs a smoothed error signal, using a voltage-controlled oscillator controlled by the smoothed error signal outputted from the low-pass filter, generates an oscillating signal and outputs the oscillating signal as the clock CLKpixel for the pixel data, and using the second frequency divider, divides a frequency of the clock CLKpixel for the pixel data outputted froze the voltage-controlled oscillator by a predetermined second division ratio, and outputs the second frequency-divided dock.

Effects of the Invention

According to the communication system and the clock synchronization method therefor according to the present invention, the source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device. The sink device extracts the time stamp value Csource(t) from the header part of the video packet Pvideo, generates a fixed reference clock CLKref based on the counted value Csource (t) using a first PLL circuit, and generates the clock CLKpixel for the pixel data of the source device based on the reference clock CLKref using a second PLL circuit. The source device transmits information Fpixel on a clock frequency for the pixel data to the sink device. The sink device sets the division parameters for the first PLL circuit and the second PLL circuit based on the information Fpixel on the clock frequency for the pixel data, and generates the time stamp by the clock CLKpixel for the pixel data. Therefore, it is possible to easily realize change in the clock frequency. In addition, for example, by using the VCXO in the first PLL circuit, using the VCO is in the second PLL circuit, and setting the frequency division parameters for the first and second PLL circuits depending on the frequency of the clock CLKpixel for the pixel data, it is possible to provide the communication system

Figure 1:
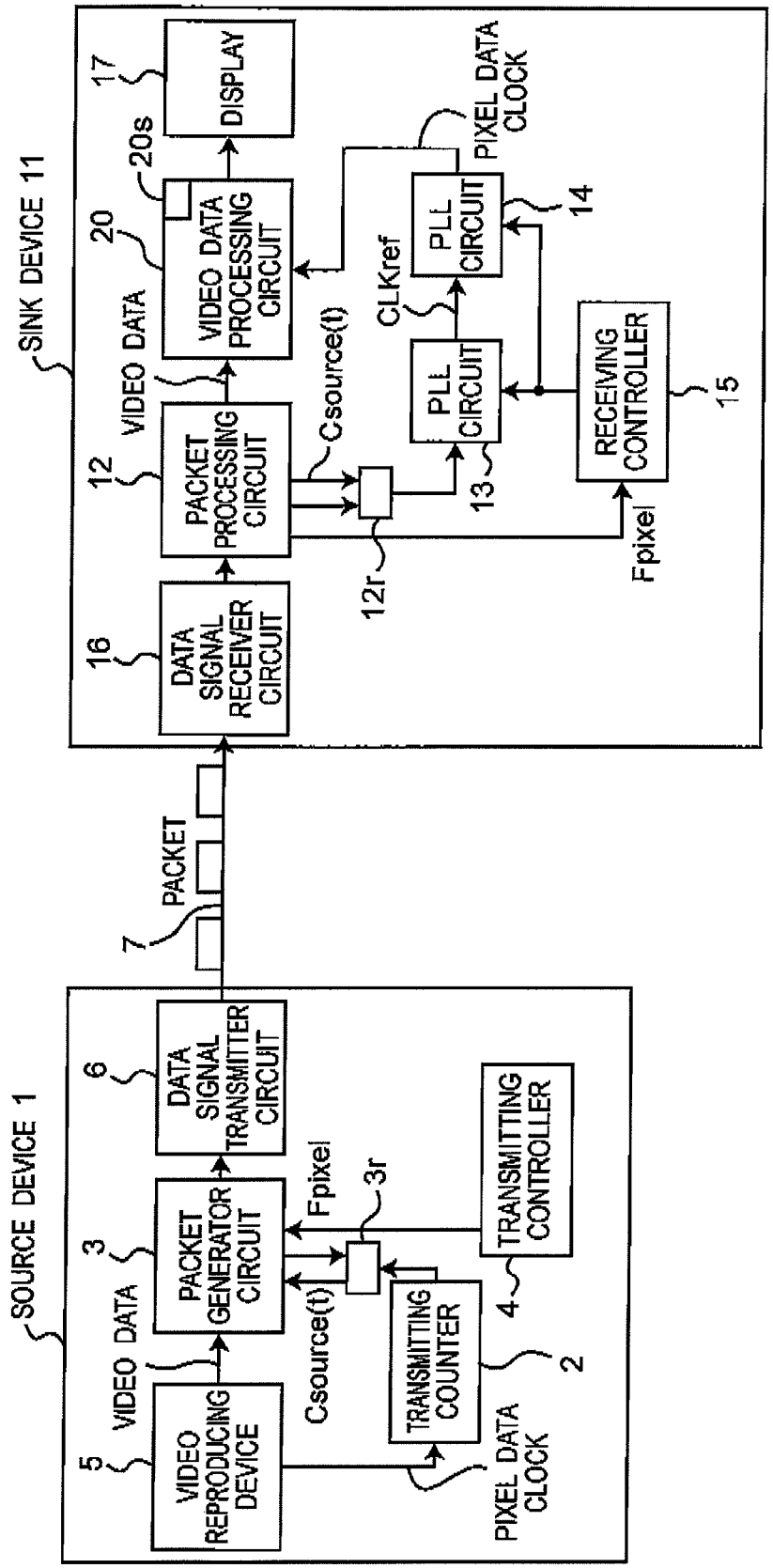
FIG. 1 is a block diagram showing a configuration of a communication system using a clock synchronization method according to a first embodiment of the present invention.

DESCRIPTION OF REFERENCE SYMBOLS 1, 1A, 1B, 1C . . . Source device,
2, 2A . . . Transmitting counter,
3 . . . Packet generator circuit,
3r, 3ra, 3rb, 12r, 12ra, 12rb . . . Register,
4, 4A . . . Transmitting controller,
5 . . . Video reproducing device,
5A Audio reproducing device,
5B Video and audio reproducing device
6 . . . Data signal transmitter circuit,
7 . . . Communication line,
11, 11A, 11B, 11C, 11D, 11E, 11F, 11G . . . Sink device,
12 . . . Packet processing circuit,
13, 13A, 14, 18, 19, 19A . . . PLL circuit,
15, 15A, 15B . . . Receiving controller,
16 . . . Data signal receiver circuit,
17 . . . Display,
17A . . . Loudspeaker,
17B . . . Display with loudspeaker,
20 . . . Video data processing circuit,
20A . . . Audio data processing circuit,
20B . . . Video and audio data processing circuit,
20s . . . Control signal generator,
21 . . . Subtracter,
22 . . . Filter,
23 . . . D/A converter,
24 . . . . Voltage-controlled crystal oscillator (VCXO),
25 . . . Receiving counter,
26 . . . Multiplier,
31, 32 . . . Frequency divider,
33 . . . Phase comparator,
34 . . . Low-pass filter (LPP),
35 . . . Voltage-controlled oscillator (VCO), and
36 . . . Counter.

BEST MODE FOR CARRYING OUT THE INVENTION

Embodiments of the present invention will be described hereinafter with reference to the drawings. In the embodiments, components similar to each other are denoted by the same reference numerals.

First Embodiment

Figure 2:
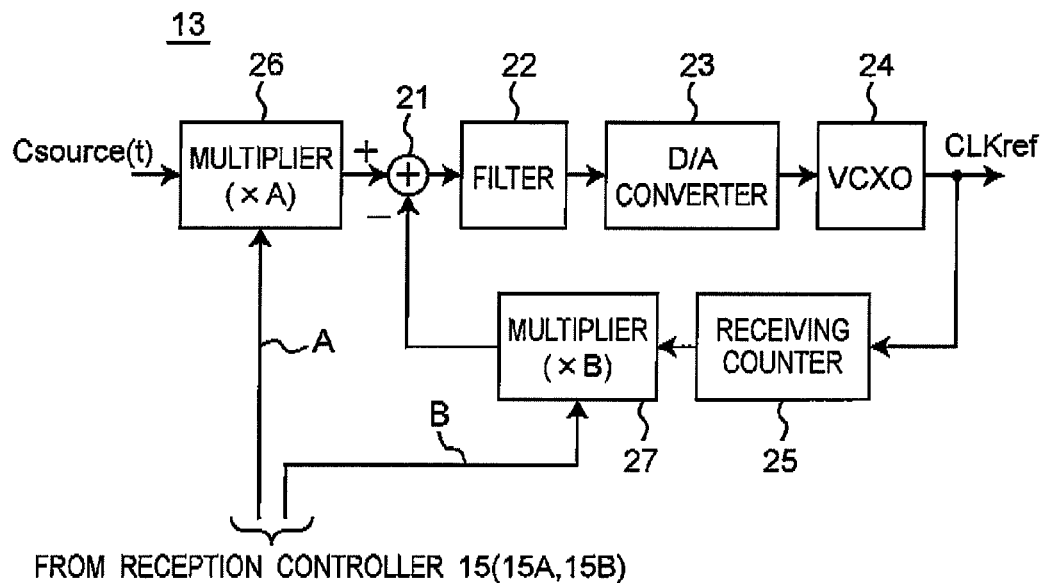
FIG. 2 is a block diagram showing a configuration of a PLL circuit 13 of FIG. 1.
Figure 3:
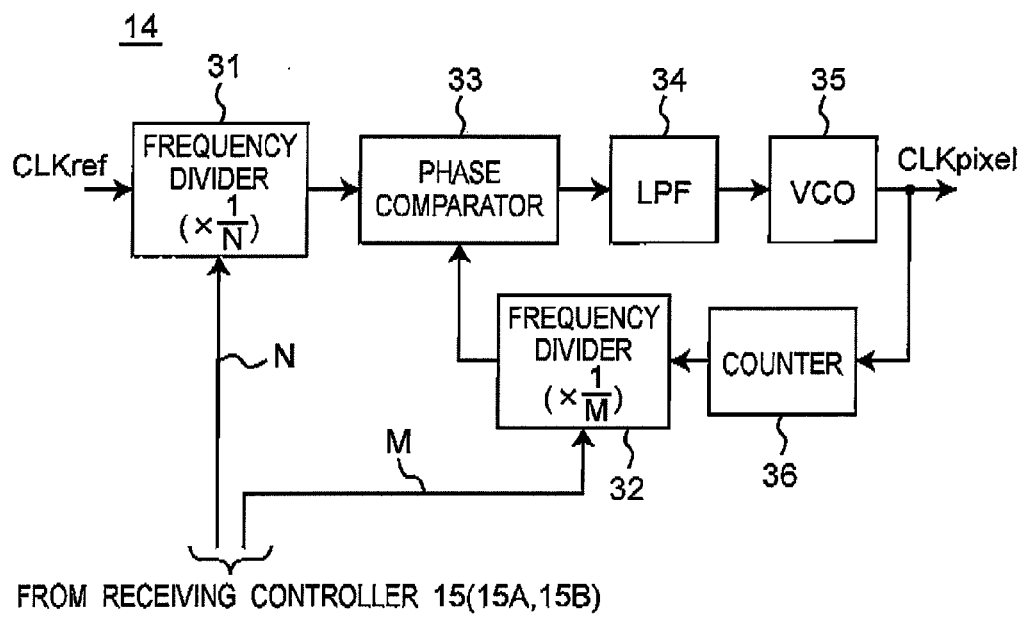
FIG. 3 is a block diagram showing a configuration of a PLL circuit 14 of FIG. 1.

FIG. 1 is a block diagram showing a configuration of a communication system using a clock synchronization method according to a first embodiment of the present invention. FIG. 2 is a block diagram showing a configuration of a PLL circuit 13 of FIG. 1. FIG. 3 is a block diagram showing a configuration of a PLL circuit 14 of FIG. 1.

The first embodiment of the present invention is characterized as follows. In the communication system in which a source device 1 and a sink device 11 are connected to each other via a communication line 7 such as a wireless communication line (which may be a wired communication line), the source device 1 counts a clock CLKpixel for pixel data using a transmitting counter 2, adds a counted value Csource(t) of the transmitting counter 2 at a timing of transmitting a video packet Pvideo to the sink device 11, to a header part of the video packet Pvideo, and transmits the video packet Pvideo. The sink device 11 extracts the counted value Csource(t) of the transmitting counter 2 from the header part of the video packet Pvideo, the PLL circuit 13 generates a fixed reference clock CLKref based on the counted value Csource(t) of the transmitting counter 2, the PLL circuit 14 reproduces the clock CLKpixel for the pixel data of the source device 1 based on the reference clock CLKref, a transmitting controller 4 of the source device 1 transmits information Fpixel on a dock frequency for the pixel data to the sink device 11 via the communication line 7, and a receiving controller 15 of the sink device 11 sets frequency division parameters A, B, M and N for the PLL circuits 13 and 14 based on the information Fpixel on the clock frequency for the pixel data. In addition, a time stamp is generated by the clock CLKpixel for the pixel data, and therefore, it is possible to easily realize the change in the clock frequency. In addition, by using a VCXO and a VCO in the PLL circuits 13 and 14, respectively, and setting the frequency division parameters A, B, M and N for the PLL circuits 13 and 14 depending on a frequency of the clock CLKPixel for the pixel data, it is realized to generate a clock synchronized with the pixel data of the source device 1 in the sink device 11.

Referring to FIG. 1, the source device 1 is configured to include the transmitting counter 2, a packet generator circuit 3, a register 3r, the transmitting controller 4, a video reproducing device 5 such as a DVD player, and a data signal transmitter circuit 6. On the other hand, the sink device 11 is configured to include a packet processing circuit 12, a register 12r, the PLL circuits 13 and 14, the receiving controller 15, a video data processing circuit 20 including a control signal generator 20s, a data signal receiver circuit 16, and a display 17 for reproducing video data.

The configuration of the communication system, which uses the clock synchronization method and is configured as mentioned above, and an operation of the same communication system will be described with reference to FIGS. 1 to 3.

First of all, an operation of the source device 1 will be described. Referring to FIG. 1, the source device 1 counts, for example, the clock CLKpixel (having a frequency of, for example, (number of pixels per horizontal line 2200)×(number of horizontal lines 1125)×(field frequency 60 Hz)=148.5 MHz) for pixel data from the video reproducing device 5 using the transmitting counter 2. The transmitting counter 2 outputs the counted value Csource(t) to the register 3r. The register 3r outputs the counted value Csource(t) to the packet generator circuit 3 in response to a load instruction from the packet generator circuit 3. Next, in the packet generator circuit 3, the counted value Csource(t) of the transmitting counter 2 is added to the header part of each video data packet Pvideo as a time stamp value at every timing when the data signal transmitter circuit 6 transmits the packet Pvideo to the sink device 11. The packet generator circuit 3 generates a data signal including the video data packet Pvideo, which includes the video data from the video reproducing device 5 and information Fpixel on the clock frequency for the pixel data from the transmitting controller 4, and transmits the data signal to the data signal receiver circuit 16 of the sink device 11 via the data signal transmitter circuit 6 and the communication line 7.

Next, an operation of the sink device 11 will be described. The data signal receiver circuit 16 receives the data signal, which includes the packet Pvideo and is transmitted from the source device 1, and outputs the packet Pvideo to the packet processing circuit 12. The packet processing circuit 12 extracts the time stamp value Csource(t) added to the header of the packet Pvideo transmitted from the source device 1, transmits a set instruction to the register 12r, and thereafter, outputs the time stamp value Csource(t) to the register 12r. The register 12r outputs the time stamp value Csource(t) transmitted from the packet processing circuit 12 to the PLL circuit 13. In addition, the packet processing circuit 12 demultiplexes the video data, and outputs the demultiplexed video data to the video data processing circuit 20. The control signal generator 20s of the video data processing circuit 20 generates a horizontal synchronized signal HSYNC and a vertical synchronizing signal VSYNC based on the clock for the pixel data transmitted from the PLL circuit 14, and outputs the horizontal synchronized signal HSYNC and the vertical synchronizing signal VSYNC to the display 17. The video data processing circuit 20 converts the inputted video data into a video signal by executing a predetermined packet decoding process or the like on the inputted video data based on the clock for the pixel data transmitted from the PLL circuit 14, and outputs the video signal to the display 17 so as to display video thereon.

Referring to FIG. 2, the PLL circuit 13 is configured to include a subtracter 21, a filter 22, a D/A converter 23, a VCXO 24, a receiving counter 25, and multipliers 26 and 27, and generates the reference clock CLKref based on the inputted time stamp value Csource(t). In this case, the PLL circuit 13 operates as follows.

Referring to FIG. 2, first of all, the time stamp value Csource(t) outputted by the source device 1 is inputted to the multiplier 26, and the multiplier 26 multiplies the Csource(t) by a predetermined multiplier factor A, and outputs data indicating a multiplication result to the subtracter 21. The subtracter 21 calculates a differential value D(t) between data inputted from the multipliers 26 and 27, respectively, and outputs the differential value D(t) to the filter 22. The filter 22, which is, for example, a LPF, smoothes the differential value D(t), and outputs a smoothed data Dav(t) to the D/A converter 23. The D/A converter 23 converts the smoothed data Dav(t) into an analog voltage, and outputs the analog voltage to the VCXO 24 so as to control an oscillating frequency of the VCXO 24. The VCXO 24 outputs the reference clock CLKref (having a frequency of, for example, 27 MHz) to the receiving counter 25. The receiving counter 25 counts the reference clock CLKref, and outputs a counted value Count(t) to the multiplier 27. The multiplier 27 multiplies the counted value Count(t) by a predetermined multiplier factor B, and outputs data indicating a multiplication result to the subtracter 21.

In this case, a ratio of the multiplier factor A of the multiplier 26 to the multiplier factor B of the multiplier 27 is equal to a ratio R=f(CLKref)/f(CLKpixel) (for example, 27 MHz/148.5 MHz=1/5.5) of a frequency f(CLKref) of the reference clock CLKref of the VCXO 24 to a frequency f(CLKpixel) of the clock CLKpixel for the pixel data of the video data. When R<1, A and B are set to satisfy A=R and B=1. When R>1, A and B are set to satisfy A=1 and B=1/R. In addition, when R=1, A and B are set to satisfy A=B=1. By configuring the PLL circuit 13 as mentioned above, the PLL circuit 13 controls the oscillating frequency of the reference clock CLKref, which is an outputted signal from the VCXO 24, so that the time stamp value Csource(t) coincides with outputted data Ccount(t) from the receiving counter 25, and outputs the reference clock CLKref to the PLL circuit 14.

Referring to FIG. 3, the PLL circuit 14 is configured to include frequency dividers 31 and 32, a phase comparator 33, a low-pass filter (referred to as a LPF hereinafter) 34, a VCO 35, and a counter 36. The PLL circuit 14 generates and outputs the clock CLKpixel for the pixel data of the video data based on the reference clock CLKref transmitted from the PLL circuit 13. An operation of the PLL circuit 14 will be described below.

Referring to FIG. 3, first of all, the reference clock CLKref outputted from the VCXO 24 of the PLL circuit 13 is inputted to the frequency divider 31. The frequency divider 31 divides the frequency of the reference clock CLKref with the division ratio N, and outputs a frequency-divided clock CLKref/N to the phase comparator 33. The phase comparator 33 compares a phase of the frequency-divided clock CLKref/N with a phase of a frequency-divided clock inputted from the frequency divider 32, and outputs an error signal representing a phase comparison result to the LPF 34. The LPF 34 smoothes the error signal, and outputs a smoothed error signal to the VCO 35 so as to control an oscillating frequency of the VCO 35. The VCO 35 generates the clock CLKpixel for the pixel data of the video data, and outputs the clock CLKpixel to the frequency divider 32. The frequency divider 32 divides the frequency of the clock CLKpixel for the pixel data with the division ratio M, and outputs a frequency-divided clock CLKpixel/M to the phase comparator 33.

In this case, a ratio N/M of the division ratio N of the frequency divider 31 of the PLL circuit 14 to the division ration M of the frequency divider 32 is equal to a ratio R=f (CLKref)/f(CLKpixel) (for example, 27 MHz/148.5 MHz=1/5.5) of the frequency f(CLKref) of the reference clock CLKref of the VCXO 24 to the frequency f(CLKpixel) of the clock CLKpixel for the pixel data. The PLL circuit 14 configured as mentioned above controls the frequency of the clock CLKpixel for the pixel data, which is an outputted oscillation signal from the VCO 35, so that the frequency and phase of the frequency-divided clock CLKref/N outputted from the frequency divider 31 coincide with those of the frequency-divided clock CLKpixel/M outputted from the frequency divider 32, respectively.

Finally, a method of setting the frequency division parameters A, B, M and N for the PLL circuits 13 and 14 will be described. The transmitting controller 4 of the source device 1 transmits packets including information Fpixel on the clock frequency for the pixel data to the sink device 11 via the data signal transmitter circuit 6 and the communication circuit 7. The data signal receiver circuit 16 of the sink device 11 receives the packets including the information Fpixel on the clock frequency for the pixel data, and outputs the packets to the receiving controller 15 via the packet processing circuit 12. The receiving controller 15 sets the multiplier factor A of the multiplier 26 of the PLL circuit 13, the multiplier factor B of the multiplier 27 of the PLL circuit 13, the division ratio N of the frequency divider 31 of the PLL circuit 14, and the division ratio M of the frequency divider 32 of the PLL circuit 14 based on the information Fpixel on the clock frequency for the pixel data.

According to the present embodiment configured as described above, the source device 1 counts the clock CLKpixel for the pixel data using the transmitting counter, adds the counted value Csource(t) of the transmitting counter at the timing of transmitting the video packet Pvideo to the sink device 11, to the header part of the video packet Pvideo, and transmits the video packet Pvideo. The sink device 11 extracts the counted value Csource(t) of the transmitting counter from the header part of the video packet Pvideo, the PLL circuit 13 generates the fixed reference clock CLKref based on the counted value Csource(t) of the transmitting counter 2, the PLL circuit 14 reproduces the clock CLKpixel for the pixel data of the source device 1 based on the reference clock CLKref, the transmitting controller 4 of the source device 1 transmits the information Fpixel on the clock frequency for the pixel data to the sink device 11, and the receiving controller 15 of the sink device 11 sets the frequency division parameters A, B, M and N for the PLL, circuits 13 and 14 based on the information Fpixel on the clock frequency for the pixel data. In addition, the time stamp is generated by the clock CLKpixel for the pixel data, and therefore, it is possible to easily realize the change in the clock frequency. In addition, by using the VCXO 24 and the VCO 35 in the PLL circuits 13 and 14, respectively, and setting the frequency division parameters A, B, M and N for the PLL circuits 13 and 14 depending on the frequency of the clock CLKPixel for the pixel data, it is possible to provide the communication system which is stable with small jitter for the clock frequency changing in a wide range from several tens of megahertz to several hundreds of megahertz, and the clock synchronization method for the same communication system.

Second Embodiment

Figure 4:
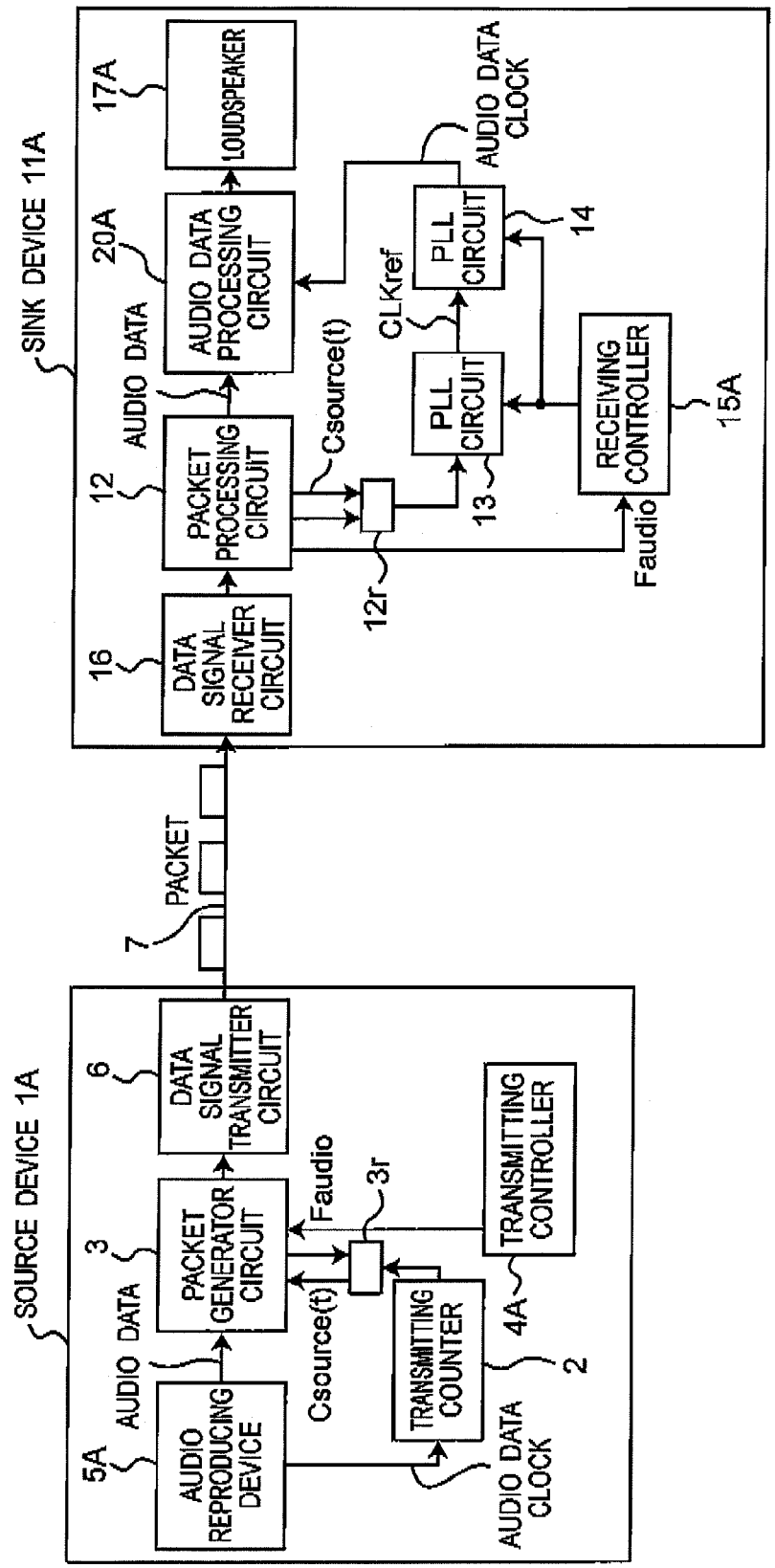
FIG. 4 is a block diagram showing a configuration of a communication system using a clock synchronization method according to a second embodiment of the present invention.

FIG. 4 is a block diagram showing a configuration of a communication system using a clock synchronization method according to a second embodiment of the present invention. Referring to FIG. 4, a source device 1A is configured to include the transmitting counter 2, the packet generator circuit 3, the register 3r, a transmitting controller 4A, an audio reproducing device 5A such as a CD player, and the data signal transmitter circuit 6. In addition, a sink device 11A is configured to include the packet processing circuit 12, the register 12r, the PLL circuits 13 and 14, a receiving controller 15A, the data signal receiver circuit 16, an audio data processing circuit 20A, and a loudspeaker 17A for reproducing audio data.

The communication system according to the second embodiment of FIG. 4 is different from that of the first embodiment of FIG. 1 in the following respects:

(1) In the source device 1A, a reference clock CLKaudio for audio data are counted using the transmitting counter 2.

(2) In the source device 1A, the packet generator circuit 3 packetizes audio data from the audio reproducing device 5A into audio packets using the reference clock CLKaudio for the audio data, and the data signal transmitter circuit 6 transmits the audio packets to the sink device 1A.

(3) In the sink device 1A, the PLL circuit 14 reproduces the clock CLKaudio for the audio data based on the reference clock CLKref.

(4) The transmitting controller 4 of the source device 1A transmits information Faudio on a clock frequency for the audio data to the sink device 11 via the packet generator circuit 3 and the data signal processing circuit 6.

(5) The receiving controller 15 of the sink device 11A sets the frequency division parameters A, B, M and N for the PLL circuits 13 and 14 based on the information Faudio on the clock frequency for the audio data separated and extracted by the packet processing circuit 12.

The configuration of the communication system, which uses the clock synchronization method according to the present embodiment of FIG. 4, and an operation of the communication system will be described below.

Referring to FIG. 4, first of all, the source device 1A counts a master clock CLKaudio (having a frequency of, for example, sample frequency 96 kHz×128=12.288 KHz) for audio data in the audio data from the audio reproducing device 5A using the transmitting counter 2. The transmitting counter 2 outputs a counted value Csource(t) to the register 3r. The register 3r outputs the counted value Csource(t) to the packet generator circuit 3 in response to the load instruction from the packet generator circuit 3. Next, the packet generator circuit 3 adds the counted value Csource(t) of the transmitting counter 2 to a header part of audio data packet Paudio including the audio data from the audio reproducing device 5A as a time stamp value at every timing of transmitting the audio packet Paudio from the source device 1 to the sink device 11. Thereafter, the data signal transmitter circuit 6 transmits a data signal including the audio packet Paudio to the data signal receiver circuit 16 of the sink device 11A via the communication line 7.

The data signal receiver circuit 16 of the sink device 11A receives the audio packet Paudio transmitted from the source device 1A, and outputs the audio packet Paudio to the packet processing circuit 12. The packet processing circuit 12 extracts the time stamp value Csource(t) added to the header of the packet Paudio transmitted from the source device 1A, transmits the set instruction to the register 12r, and thereafter, outputs the time stamp value Csource(t) to the register 12r. The register 12r outputs the time stamp value Csource(t) from the packet processing circuit 12 to the multiplier 26 (see FIG. 2) of the PLL circuit 13. Further, the packet processing circuit 12 demultiplexes the audio data, and transmits the demultiplexed audio data to the audio data processing circuit 20A. The audio data processing circuit 20A converts the inputted audio data into an audio signal by executing a predetermined packet decoding process or the like on the inputted audio data based on the clock for the audio data transmitted from the PLL circuit 14, and outputs the audio signal to the loudspeaker 17A so as to output audio.

Referring to FIG. 2, the PLL circuit 13, which operates in a manner similar to that of the first embodiment, generates the reference clock CLKref based on the time stamp value Csource(t), and outputs the reference clock CLKref to the frequency divider 31 of the PLL circuit 14. In this case, the ratio of the multiplier factor A of the multiplier 26 to the multiplier factor B of the multiplier 27 is equal to a ratio R=f(CLKref)/f(CLKaudio) (for example, 27 MHz/12.288 MHz) of the frequency f(CLKref) of the reference clock CLKpixel of the VCXO 24 to a frequency f(CLKaudio) of the master clock CLKaudio for the audio data. When R<1, A and B are set to satisfy A=R and B=1. When R>1, A and B are set to satisfy A=1 and B=1/R. In addition, when R=1, A and B are set to satisfy A=B=1. By configuring the PLL circuit 13 as mentioned above, the PLL circuit 13 controls the frequency of the reference clock CLKref, which is an outputted signal from the VCXO 24, so that the time stamp value Csource(t) coincides with outputted data Ccount(t) from the receiving counter 25, and outputs the reference clock CLKref to the PLL circuit 14.

Referring to FIG. 3, the PLL circuit 14, which operates in a manner similar to that of the first embodiment, reproduces and outputs the master clock CLKaudio for the audio data based on the reference clock CLKref from the PLL circuit 13. In this case, the ratio N/M of the division ratio N of the frequency divider 31 of the PLL circuit 14 to the division ration M of the frequency divider 32 is equal to a ratio R=f(CLKref)/f(CLKaudio) (for example, 27 MHz/12.288 MHz) of the frequency f(CLKref) of the reference clock CLKref of the VCXO 24 to the frequency f(CLKaudio) of the master clock CLKaudio for the audio data. The PLL circuit 14 controls the frequency of the master clock CLKaudio for the audio data, which is an outputted signal from the VCO 35, so that the frequency and phase of the frequency-divided clock CLKref/N outputted from the frequency divider 31 coincide with those of the frequency-divided clock CLKaudio/M outputted from the frequency divider 32, respectively.

Finally, a method of setting the frequency division parameters A, B, M and N for the PLL circuits 13 and 14 will be described. The transmitting controller 4 of the source device 1A transmits packets including information Faudio on the clock frequency for the audio data to the sink device 11A via the packet generator circuit 3 and the data signal transmitter circuit 6. The data signal receiver circuit 16 of the sink device 11A receives the packets including the information Faudio on the clock frequency for the audio data, and outputs the packets to the receiving controller 15. The receiving controller 15 sets the multiplier factor A of the multiplier 26 of the PLL circuit 13, the multiplier factor B of the multiplier 27 of the PLL circuit 13, the division ratio N of the frequency divider 31 of the PLL circuit 14 and the division ratio M of the frequency divider 32 of the PLL circuit 14, based on the information Faudio on the clock frequency for the audio data.

As described above, according to the present embodiment, the source device 1A counts the master clock CLKaudio for the audio data using the transmitting counter, adds the counted value Csource(t) of the transmitting counter 2 at the timing of transmitting each audio packet Pvideo to the sink device 11A, to the header part of the audio packet Pvideo, and transmits the audio packet Paudio with the counted value Csource(t) added to the header part thereof. The sink device 11A extracts the counted value Csource(t) from the header part of the audio packet Faudio. The PLL circuit 13 generates the fixed reference clock CLKref based on the counted value Csource(t), and the PLL circuit 14 reproduces the master clock CLKaudio for the audio data of the source device 1A based on the reference clock CLKref. The transmitting controller of the source device 1A transmits the information Faudio on the clock frequency for audio data to the sink device 11A, and the receiving controller 15A of the sink device 11A sets the division parameters A, B, M and N for the PLL circuits 13 and 14 based on the information Faudio on the clock frequency for the audio data. In addition, the time stamp is generated based on the master clock CLKaudio for the audio data, and therefore, it is possible to easily realize the change in the clock frequency. In addition, by using the VCXO 24 and the VCO 35 in the PLL circuits 13 and 14, respectively, and setting the frequency division parameters A, B, M and N for the PLL circuits 13 and 14 depending on the frequency of the master clock CLKaudio for the audio data, it is possible to provide the communication system which is stable with small jitter for the clock frequency changing in a wide range from several tens of megahertz to several hundreds of megahertz, and the clock synchronization method for the same communication system.

Third Embodiment

Figure 5:
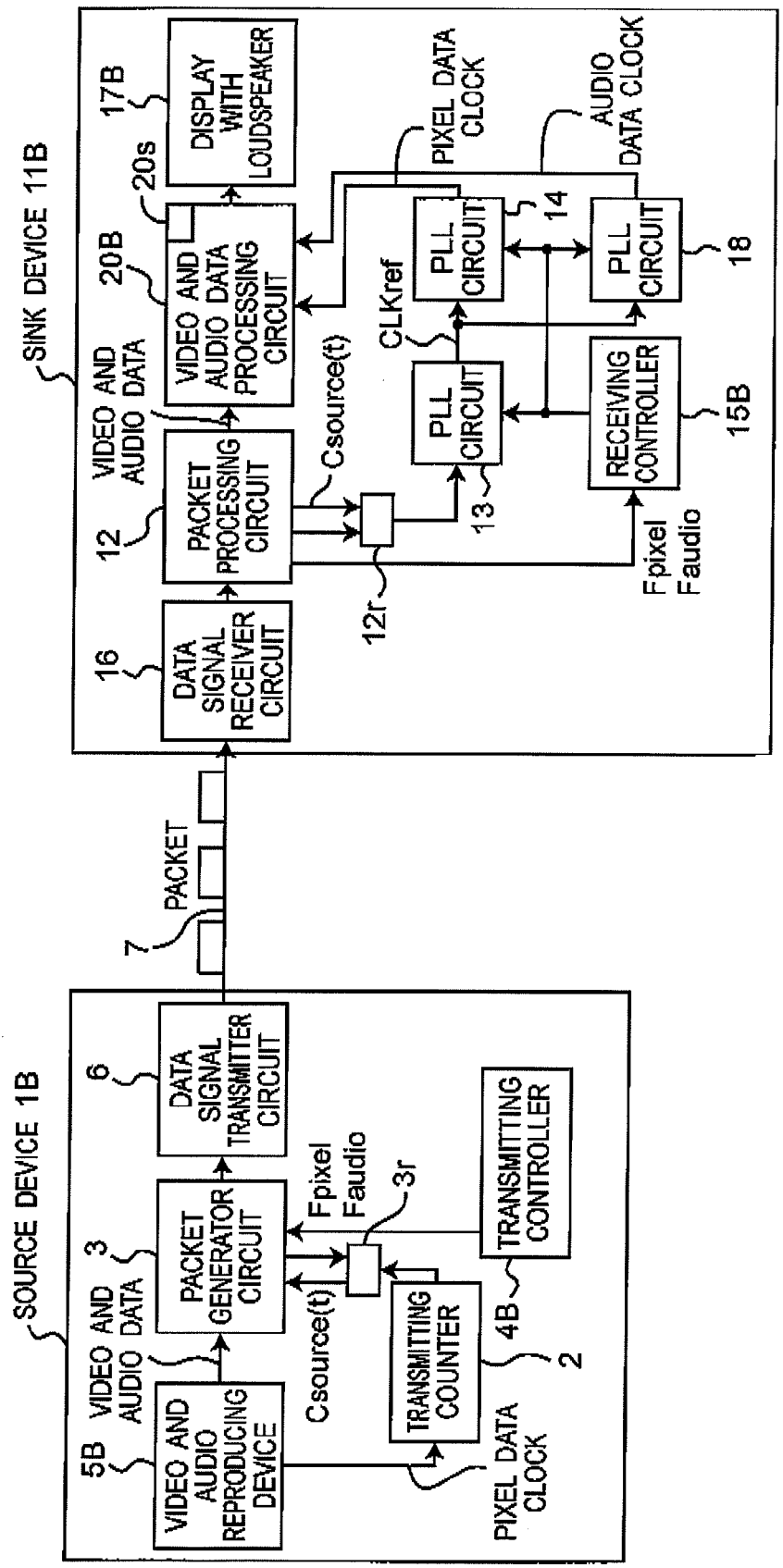
FIG. 5 is a block diagram showing a configuration of a communication system using a clock synchronization method according to a third embodiment of the present invention.

FIG. 5 is a block diagram showing a configuration of a communication system using a clock synchronization method according to a third embodiment of the present invention. Referring to FIG. 5, a source device 1B is configured to include the transmitting counter 2, the packet generator circuit 3, the register 3r, a transmitting controller 4B, a video and audio reproducing device 5B such as the DVD player, and the data signal transmitter circuit 6. Further, a sink device 11B is configured to include the packet processing circuit 12, the register 12r, PLL circuits 13, 14 and 18, a receiving controller 15B, the data signal receiver circuit 16, a video and audio data processing circuit 205 including the control signal generator 20s, and a display 17B with a loudspeaker for reproducing video and audio data.

The communication system according to the third embodiment is different from that of the first embodiment of FIG. 1 in the following respects:

(1) The packet generator circuit 3 of the source device 1B packetizes video and audio data including video data and audio data from the video and audio reproducing device 5B based on the counted value Csource(t) of the transmitting counter 2, and transmits the generated video and audio packets to the sink device 11B via the data signal transmitter circuit 6.

(2) There is further provided the PLL circuit 18 for reproducing the clock CLKaudio for the audio data based on the reference clock CLKref.

(3) The transmitting controller 45 of the source device 1B transmits the information Fpixel on the clock frequency for pixel data and the information Faudio on the clock frequency for the audio data to the sink device 115 via the data signal processing circuit 6.

(4) The receiving controller 15 of the sink device 11B sets the frequency division parameters A, B, M and N for the PLL circuits 13 and 14 based on the information Faudio on the clock frequency for the audio data separated and extracted by the packet processing circuit 12.

The configuration of the communication system, which uses the clock synchronization method according to the third embodiment, and an operation of the communication system will be described below.

Referring to FIG. 5, the source device 1B counts the clock CLKpixel (having a frequency of, for example, (number of pixels per horizontal line 2200)×(number of horizontal lines 1125)×(field frequency 60 Hz)=148.5 MHz) for the pixel data in the video data from the video reproducing device 5 using the transmitting counter 2, for example. The transmitting counter 2 outputs the counted value Csource(t) to the register 3r. The register 3r outputs the counted value Csource(t) to the packet generator circuit 3 in response to the load instruction from the packet generator circuit 3. Next, the packet generator circuit 3 adds the counted value Csource(t) of the transmitting counter 2 to a header part of a mixture packet Pav including the video data and the audio data at every timing when the data signal transmitter circuit 6 of the source device 1B transmits the packet Pav to the sink device 11B as a time stamp value. The packet generator circuit 3 transmits a data signal including the packet Pav to the data signal receiver circuit 16 of the sink device 11B via the data signal transmitter circuit 6 and the communication line 7.

Next, the packet processing circuit 12 of the sink device 11B extracts the time stamp value Csource(t) added to the header of the packet Pav, which is transmitted from the source device 1B and is received by the data signal receiver circuit 16, transmits the set instruction to the register 12r, and thereafter, outputs the time stamp value Csource(t) to the register 12r. The register 12r outputs the time stamp value Csource(t) transmitted from the packet processing circuit 12 to the PLL circuit 13. Further, the packet processing circuit 12 demultiplexes the video data and the audio data, and outputs the demultiplexed video data and audio data to the video and audio data processing circuit 20B. The control signal generator 20s of the video and audio data processing circuit 20B generates the horizontal synchronized signal HSYNC and the vertical synchronizing signal VSYNC based on the clock for the pixel data transmitted from the PLL circuit 14, and outputs the horizontal synchronized signal HSYNC and the vertical synchronizing signal VSYNC to the display 17. The video and audio data processing circuit 20B converts the inputted video data and audio data into the video signal and the audio signal by executing a predetermined packet decoding process or the like on the inputted video data and audio data based on the clock for the pixel data and the clock for the audio data transmitted from the PLL circuits 14 and 18, and outputs the video signal and the audio signal to the display 17B with the loudspeaker so as to display video thereon and to output audio.

The PLL circuit 13, which operates in a manner similar to that of the first embodiment, generates the reference clock CLKref based on the time stamp value Csource(t), and outputs the reference clock CLKref to the PLL circuits 14 and 18. The PLL circuit 14, which operates in a manner similar to that of the first embodiment, generates and outputs the clock CLKpixel for the pixel data based on the reference clock CLKref. In addition, the PLL circuit 18, which is configured and operates in a manner similar to that of the PLL circuit 14, reproduces and outputs the master clock CLKaudio for the audio data based on the reference clock CLKref from the PLL circuit 13.

The transmitting controller 43 of the source device 1B outputs the information Fpixel on the clock frequency for the pixel data and the information Faudio on the master clock frequency for the audio data to the packet generator circuit 3. The packet generator circuit 3 generates packets including those information, and transmits the packets to the data signal receiver circuit 16 of the sink device 11B via the data signal transmitter circuit 6. The data signal receiver circuit 16 of the sink device 11B receives the packets including the information Fpixel on the clock frequency for the pixel data and the information Faudio on the master clock frequency for the audio data, and outputs the packets to the receiving controller 15B via the packet processing circuit 12. The receiving controller 15B sets the multiplier factor A of the multiplier 26 of the PLL circuit 13, the multiplier factor B of the multiplier 27 of the PLL circuit 13, the division ratio N of the frequency divider 31 of the PLL circuit 14 and the division ratio M of the frequency divider 32 of the PLL circuit 14, based on the information Fpixel on the clock frequency for the pixel data. The receiving controller 153 also sets the division ratio N of the frequency divider 31 of the PLL circuit 18 and the division ratio M of the frequency divider 32 based on the information Faudio on the clock frequency for the audio data.

As described above, according to the present embodiment, the source device 1B counts the clock CLKpixel for the pixel data using the transmitting counter 2, adds the counted value Csource(t) of the transmitting counter 2 at the timing of transmitting each mixture packet Pav including the video data and the audio data to the sink device 11B to the header part of the packet Pav, and transmits the packet Pav with the counted value Csource(t) added to the header part thereof. The sink device 11B extracts the counted value Csource(t) from the header part of the mixture packet Pav. The PLL circuit 13 generates the fixed reference clock CLKref based on the time stamp value Csource(t), the PLL circuit 14 reproduces and outputs the clock CLKpixel for the pixel data of the source device 1B based on the reference clock CLKref, and the PLL circuit 18 reproduces and outputs the clock CLKaudio for the audio data of the source device 1B based on the reference clock CLKref. The transmitting controller 43 of the source device 1B transmits the information Fpixel on the clock frequency for the pixel data and the information Faudio on the master clock frequency for the audio data to the sink device 11B via the packet generator circuit 3 and the data signal transmitter circuit 6. The receiving controller 15B of the sink device 11B sets the division parameters A, B, M and N for the PLL circuits 13, 14 and 18 based on the received information Fpixel on the clock frequency for the pixel data and the received information Faudio on the master clock frequency for the audio data. In addition, the time stamp value is generated based on the clock CLKpixel for the pixel data, and therefore, it is possible to easily realize the change in the clock frequency. In addition, by using the VCXO 24 in the PLL circuit 13, using the VCO 35 in each of the PLL circuits 14 and 18, and setting the frequency division parameters A, B, M and N for the PLL circuits 13, 14 and 18 depending on the frequency of the clock CLKpixel for the pixel data and the frequency of the master clock CLKaudio for the audio data, it is possible to provide the communication system which is stable with small jitter for the clock frequencies for both of the information Fpixel on the clock frequency for the pixel data and the information Faudio on the master clock frequency for the audio data each changing in a wide range from several tens of megahertz to several hundreds of megahertz, and the clock synchronization method for the same communication system.

Fourth Embodiment

Figure 6:
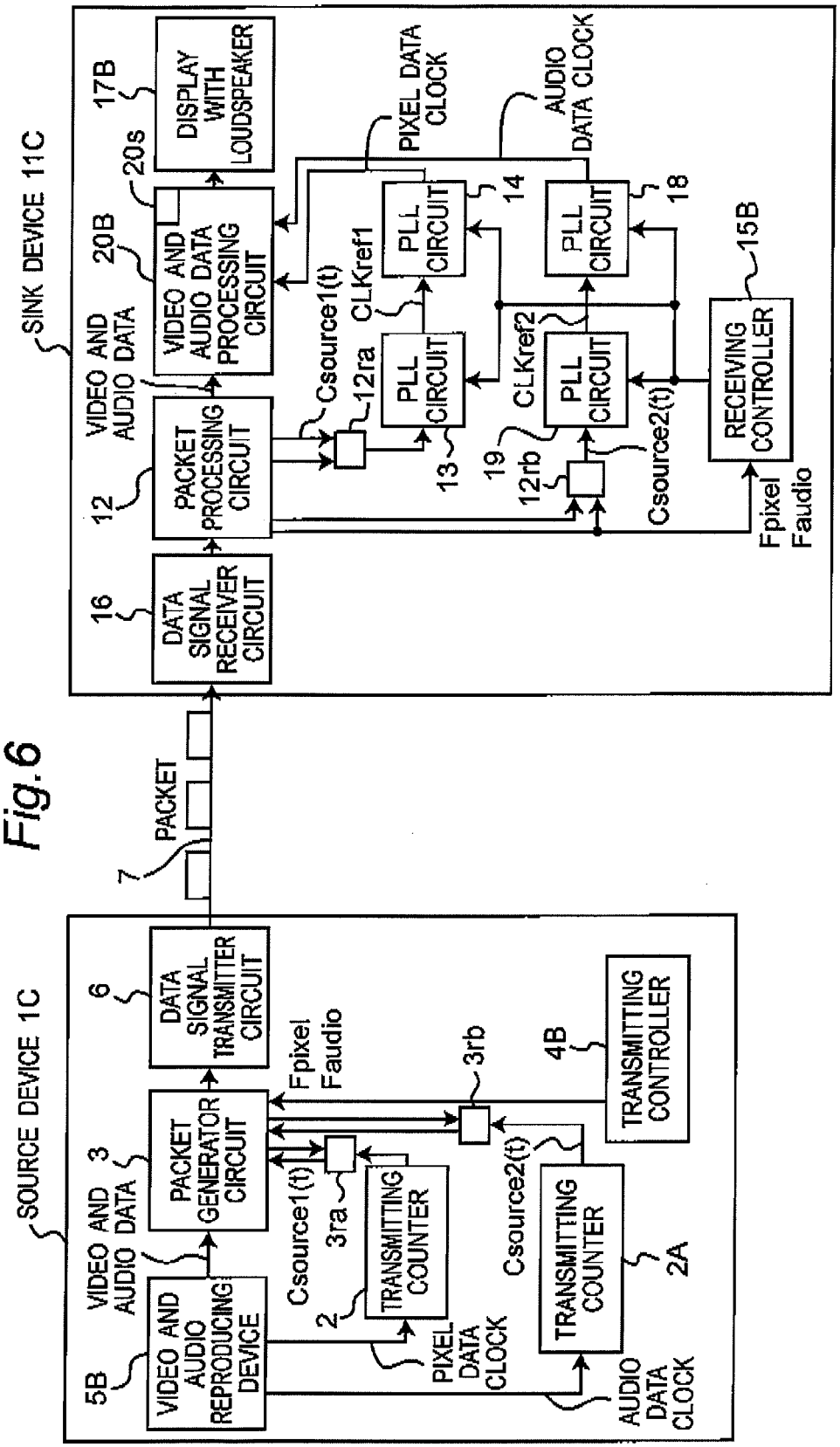
FIG. 6 is a block diagram showing a configuration of a communication system using a clock synchronization method according to a fourth embodiment of the present invention.

FIG. 6 is a block diagram showing a configuration of a communication system using a clock synchronization method according to a fourth embodiment of the present invention. Referring to FIG. 6, a source device 1C is configured to include the transmitting counter 2, a transmitting counter 2A, the packet generator circuit 3, registers 3ra and 3rb, the transmitting controller 4B, the video and audio reproducing device 5B such as the DVD player, and the data signal transmitter circuit 6. Further, a sink device 11C is configured to include the packet processing circuit 12, registers 12ra and 12rb, PLL circuits 13, 14, 18 and 19, the receiving controller 15B, the data signal receiver circuit 16, the video and audio data processing circuit 20B including the control signal generator 20s, and the display 17B with the loudspeaker for reproducing video data and audio data.

The communication system according to the fourth embodiment is different from that of the first embodiment of FIG. 1 in the following respects:

(1) In the source device 1C, the transmitting counter 2 counts the clock CLKpixel for the pixel data, and the transmitting counter 2A counts the clock CLKaudio for the audio data.

(2) The packet generator circuit 3 of the source device 1C adds a counted value Csource1($t$) of the transmitting counter 2 and a counted value Csource2($t$) of the transmitting counter 2A to the header part of the video and audio packet as time stamp values, and transmits the generated video and audio packet to the sink device 11C via the data signal transmitter circuit 6. It is preferable to add the time stamp values Csource1($t$) and Csource2($t$) to the header part of the video and audio packet alternately.

(3) The PLL circuit 13 of the sink device 11 generates a reference clock CLKref1 based on the time stamp value Csource 1($t$), and the PLL circuit 19 generates a reference clock CLKref2 based on the time stamp value Csource2($t$).

(4) The PLL circuit 14 of the sink device 11C reproduces the clock CLKpixel for the pixel data based on the reference clock CLKref1, and the PLL circuit 18 reproduces the clock CLKaudio for the audio data based on the reference clock CLKref2.

(5) The transmitting controller 4B of the source device 1C transmits the information Fpixel on the clock frequency for the pixel data and the information Faudio on the clock frequency for the audio data to the sink device 11C via the packet generator circuit 3 and the data signal processing circuit 6. The receiving controller 15B of the sink device 11C sets the frequency division parameters A, B, M and N for the PLL circuits 13, 14, 19 and 18 based on the information Fpixel on the clock frequency for the pixel data and the information Faudio on a master clock frequency for the audio data.

The configuration of the communication system, which uses the clock synchronization method according to the fourth embodiment, and an operation of the communication system will be described below.

Referring to FIG. 6, the source device 1C counts the clock CLKpixel (having a frequency of, for example, (number of pixels per horizontal line 2200)×(number of horizontal lines 1125)×(field frequency 60 Hz)=148.5 MHz) for the pixel data in the video data from the video and audio reproducing device 5B using the transmitting counter 2, for example. The transmitting counter 2 outputs the counted value Csource1($t$) to the register 3ra. The register 3ra outputs the counted value Csource1($t$) to the packet generator circuit 3 in response to the load instruction from the packet generator circuit 3. In addition, the source device 1C counts the master clock CLKaudio (having a frequency of, for example, (sample frequency 96 kHz)×128=12.288 MHz) for the audio data using the transmitting counter 2A. The transmitting counter 2A outputs the counted value Csource2($t$) to the register 3rb. The register 3rb outputs the counted value Csource2($t$) to the packet generator circuit 3 in response to the load instruction from the packet generator circuit 3. The packet generator circuit 3 adds one of the counted value Csource 1($t$) of the transmitting counter 2 and the counted value Csource2($t$) of the transmitting counter 2A, for example, alternately to the header part of the mixture packet Pav including the video data and the audio data at every timing of transmitting the packet Pav from the source device 1C to the sink device 11B as a time stamp value. The packet generator circuit 3 outputs a data signal including the mixture packet Pav to the data signal receiver circuit 16 of the sink device 11C via the data signal transmitter circuit 6 and the communication line 7.

Next, the data signal receiver circuit 16 of the sink device 11C outputs the packet Pav included in the received data signal to the packet processing circuit 12. The packet processing circuit 12 extracts the time stamp value Csource1($t$) added to the header of the packet Pav transmitted from the source device 1C, transmits the set instruction to the register 12ra, and thereafter, outputs the time stamp value Csource1($t$) to the register 12ra. The register 12ra outputs the time stamp value Csource1($t$) transmitted from the packet processing circuit 12 to the PLL circuit 13. In addition, the packet processing circuit 12 extracts the time stamp value Csource2($t$), transmits the set instruction to the register 12rb, and thereafter, outputs the time stamp value Csource2($t$) to the register 12rb. The register 12rb outputs the time stamp value Csource2($t$) transmitted from the packet processing circuit 12 to the PLL circuit 19. Further, the packet processing circuit 12 demultiplexer the video data and the audio data, and outputs the demultiplexed video data and audio data to the video and audio data processing circuit 20B. The control signal generator 20s of the video and audio data processing circuit 20B generates the horizontal synchronized signal HSYNC and the vertical synchronizing signal VSYNC based on the clock for the pixel data transmitted from the PLL circuit 14, and outputs the horizontal synchronized signal HSYNC and the vertical synchronizing signal VSYNC to the display 17. The video and audio data processing circuit 208 converts the inputted video data and audio data into the video signal and the audio signal by executing a predetermined packet decoding process or the like on the inputted video data and audio data based on the clock for the pixel data and the clock for the audio data transmitted from the PLL circuits 14 and 18, and outputs the video signal and the audio signal to the display 17B with the loudspeaker so as to display video thereon and to output audio.

Each of the PLL circuits 13 and 19 is configured and operates in a manner similar to that of the PLL circuit 13 of FIG. 2. The PLL circuit 13 generates the reference clock CLKref1 based On the time stamp value Csource 1($t$), and outputs the reference clock CLKref1 to the PLL circuit 14. The PLL circuit 19 generates the reference clock CLKref2 based on the time stamp value Csource2($t$), and outputs the reference clock CLKref2 to the PLL circuit 18. Each of the PLL circuits 14 and 18 is configured and operates in a manner similar to that of the PLL circuit 14 of FIG. 3. The PLL circuit 14 reproduces and outputs the clock CLKpixel for the pixel data based on the reference clock CLKref1. The PLL circuit 18 reproduces and outputs the clock CLKaudio for the audio data based on the reference clock CLKref2.

In addition, the transmitting controller 4B of the source device 1C transmits packets including the information Fpixel on the clock frequency for the pixel data and the information Faudio on the master clock frequency for the audio data to sink device 11C via the packet generator circuit 3 and the data signal transmitter circuit 6. The data signal receiver circuit 16 of the sink device 11C receives the packets including the information Fpixel on the clock frequency for the pixel data and the information Faudio on the master clock frequency for the audio data. The packet processing circuit 12 extracts the information Fpixel on the clock frequency for the pixel data and the information Faudio on the master clock frequency for the audio data from the packets, and outputs the information Fpixel on the clock frequency for the pixel data and the information Faudio on the master clock frequency for the audio data to the receiving controller 15B. The receiving controller 15B sets the multiplier factor A of the multiplier 26 of the PLL circuit 13, the multiplier factor B of the multiplier 27 of the PLL circuit 13, the division ratio N of the frequency divider 31 of the PLL circuit 14 and the division ratio M of the frequency divider 32 of the PLL circuit 14 based on the information Fpixel on the clock frequency for the pixel data. In addition, the receiving controller 15B sets the multiplier factor A of the multiplier 26 of the PLL circuit 19, the multiplier factor B of the multiplier 27 of the PLL circuit 19, the division ratio N of the frequency divider 31 of the PLL circuit 18 and the division ratio M of the frequency divider 32 of the PLL circuit 18 based on the value of the information Faudio on the clock frequency for the audio data.

As described above, according to the present embodiment, the source device 1C counts the clock CLKpixel for the pixel data using the transmitting counter 2, counts the master clock CLKaudio for the audio data using the transmitting counter 2A, adds one of the counted value Csource1($t$) of the transmitting counter 2 and the counted value Csource2($t$) of the transmitting counter 2A at the timing of transmitting each mixture packet Pav including the video data and the audio data to the sink device 11C to the header part of the packet Pav, and transmits the packet Pav to the sink device 11C. The sink device 11C extracts the time stamp values Csource1($t$) and Csource2($t$) from the header part of the packet Pav, and outputs the time stamp values Csource1($t$) and Csource2($t$) to the PLL circuits 13 and 19 via the registers 12a and 12b, respectively. The PLL circuit 13 generates the fixed reference clock CLKref1 based on the time stamp value Csource1($t$), and the PLL circuit 19 generates the fixed reference clock CLKref2 based on the time stamp value Csource2($t$). The PLL circuit 14 reproduces and outputs the clock CLKpixel for the pixel data of the source device 1C based on the reference clock CLKref1, and the PLL circuit 18 reproduces and outputs the master clock CLKaudio for the audio data of the source device 11C based on the reference clock CLKref2. Further, the transmitting controller 4B of the source device 11C transmits the information Fpixel on the clock frequency for the pixel data and the information Faudio on the clock frequency for the audio data to the sink device 11C via the packet generator circuit 3 and the data signal transmitter circuit 6. The receiving controller 153 of the sink device 11C sets the division parameters A, B, M and N for the PLL circuits 13, 14, 19 and 18 based on the information Fpixel on the clock frequency for the pixel data and the information Faudio on the master clock frequency for the audio data. In addition, the time stamp values are generated based on the clock CLKpixel for the pixel data and the master clock CLKaudio for the audio data, and therefore, it is possible to easily realize the change in the clock frequency. In addition, by using the VCXO 24 in the PLL circuit 13, using the VCO 35 in each of the PLL circuits 14 and 18, and setting the frequency division parameters A, B, M and N for the PLL circuits 13, 14, 19 and 18 depending on the frequency of the clock CLKpixel for the pixel data and the frequency of the master clock CLKaudio for the audio data, it is possible to provide the communication system which is stable with small jitter for the clock frequency changing in a wide range from several tens of megahertz to several hundreds of megahertz, and the clock synchronization method for the same communication system, even when the information Fpixel on the clock frequency for the pixel data is asynchronous with the information Faudio on the clock frequency for the audio data.

Fifth Embodiment

Figure 7:
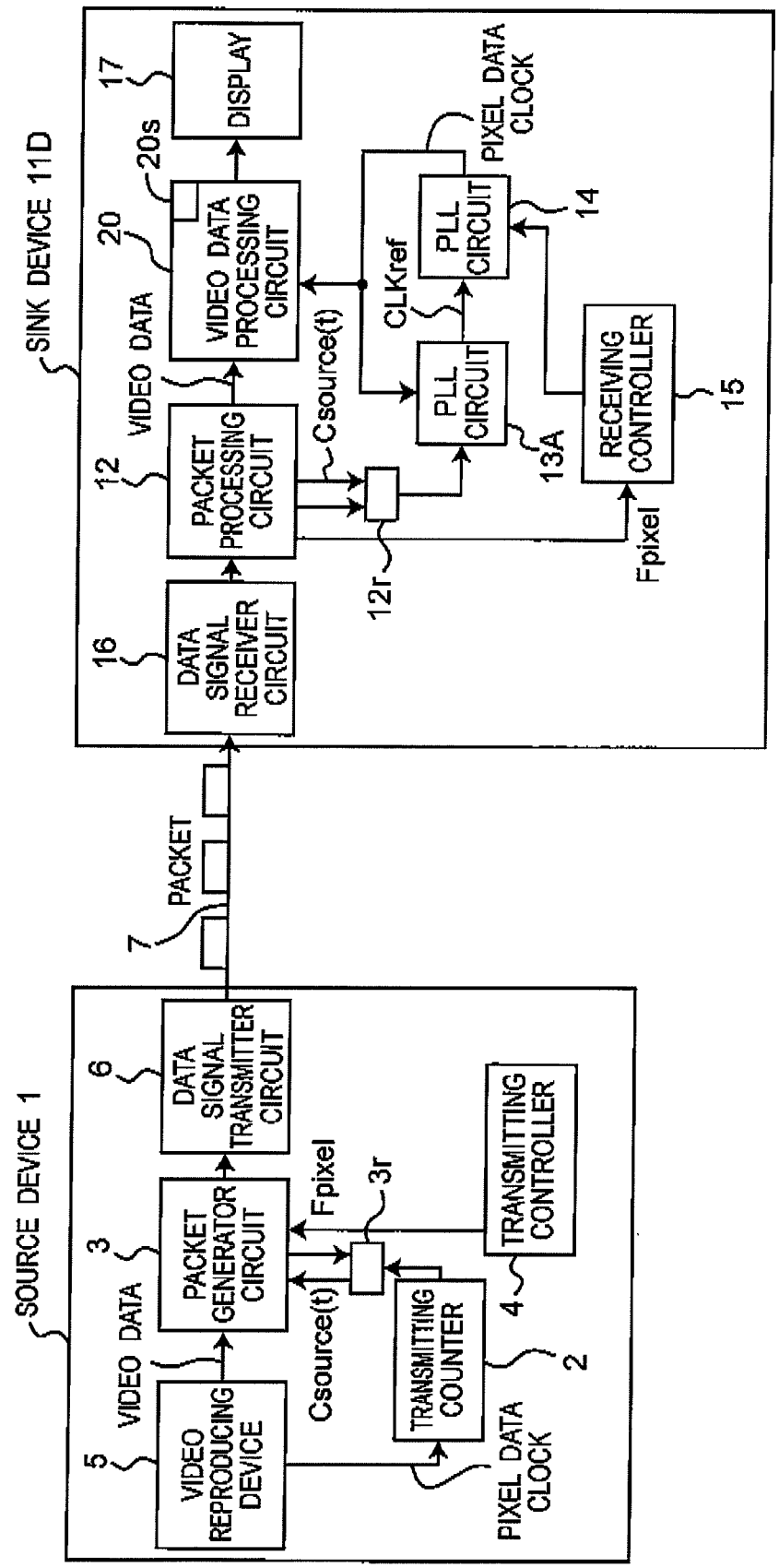
FIG. 7 is a block diagram showing a configuration of a communication system using a clock synchronization method according to a fifth embodiment of the present invention.
Figure 8:
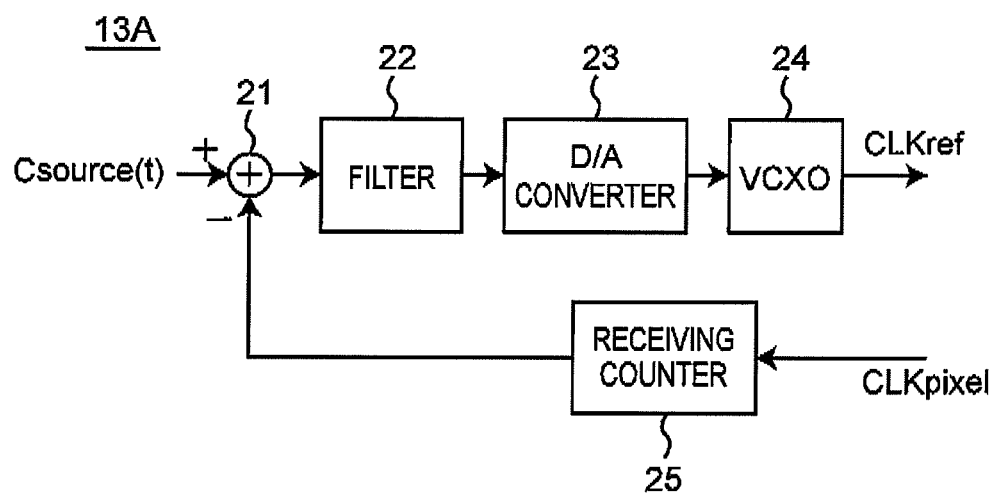
FIG. 8 is a block diagram showing a configuration of a PLL circuit 13A of FIG. 7.

FIG. 7 is a block diagram showing a configuration of a communication system using a clock synchronization method according to a fifth embodiment of the present invention. FIG. 8 is a block diagram showing a configuration of a PLL circuit 13A of FIG. 7.

The communication system of FIG. 7 is configured to include the source device 1 according to the first embodiment of FIG. 1 and a sink device 11D. In this case, a sink device 11D is configured to include the packet processing circuit 12, the register 12r, PLL circuits 13A and 14, the receiving controller 15, the video data processing circuit 20 including the control signal generator 20s, the data signal receiver circuit 16, and the display 17 for reproducing video data.

The communication system according to the fifth embodiment is different from that of the first embodiment of FIG. 1 in the following respects:

(1) The communication system includes the PLL circuit 13A which generates the reference clock CLKref based on the inputted time stamp value Csource(t) and the clock CLKpixel for pixel data from the PLL circuit 14 in stead of the PLL circuit 13.

An operation of the sink device 11D will be described. The data signal receiver circuit 16 receives the data signal including the packets Pvideo transmitted from the source device 1, and outputs the packets Pvideo to the packet processing circuit 12. The packet processing circuit 12 extracts the time stamp value Csource(t) added to the header of each packet Pvideo transmitted from the source device 1, transmits the set instruction to the register 12r, and thereafter, outputs the time stamp value Csource(t) to the register 12r. The register 12r outputs the time stamp value Csource(t) from the packet processing circuit 12 to the PLL circuit 13A. Further, the packet processing circuit 12 demultiplexes the video data, and outputs the demultiplexed video data to the video data processing circuit 20. The control signal generator 20s of the video data processing circuit 20 generates the horizontal synchronized signal HSYNC and the vertical synchronizing signal VSYNC based on the clock for the pixel data transmitted from the PLL circuit 14, and outputs the horizontal synchronized signal HSYNC and the vertical synchronizing signal VSYNC to the display 17. The video data processing circuit 20 converts the inputted video data into the video signal by executing a predetermined packet decoding process or the like on the inputted video data based on the clock for the pixel data transmitted from the PLL circuit 14, and outputs the video signal to the display 17 so as to display video thereon.

Referring to FIG. 8, the PLL circuit 13A is configured to include the subtracter 21, the filter 22, the D/A converter 23, the VCXO 24, and the receiving counter 25. The PLL circuit 13A generates the reference clock CLKref based on the inputted time stamp value Csource(t) and the clock CLKpixel for the pixel data from the PLL circuit 14. In this case, the PLL circuit 13A operates as follows.

Referring to FIG. 8, first of all, the time stamp value Csource(t) outputted from the source device 1 is inputted to the subtracter 21. The subtracter 21 calculates a differential value D(t) between data from the receiving counter 25 and the time stamp value Csource(t), and outputs the differential value D(t) to the filter 22. The filter 22, which is, for example, a LPF, smoothes the differential value D(t), and outputs smoothed data Dav(t) to the D/A converter 23. The D/A converter 23 converts the smoothed data Dav(t) into an analog voltage, and outputs the analog voltage to the VCXO 24 so as to control an oscillating frequency of the VCXO 24. The VCXO 24 outputs the reference clock CLKref (having a frequency of, for example, 27 MHz) to the PLL circuit 14. The receiving counter 25 counts the reference clock CLKref for the pixel data inputted from the PLL circuit 14, and outputs the counted value Count(t) to the subtracter 21.

The PLL circuit 14, which operates in a manner similar to that of the first embodiment, generates and outputs the clock CLKpixel for the pixel data based on the reference clock CLKref. In addition, the receiving controller 15 sets the frequency division parameters M and N for the PLL circuit 14 based on the information Fpixel on the clock frequency for the pixel data in a manner similar to that of the first embodiment.

According to the present embodiment configured as described above, the source device 1 counts the clock CLKpixel for the pixel data using the transmitting counter, adds the counted value Csource(t) of the transmitting counter at the timing of transmitting each video packet Pvideo to the sink device 11D to the header part of the video packet Pvideo, and transmits the video packet Pvideo with the counted value Csource(t) added to the header part thereof. The sink device 11D extracts the counted value Csource(t) of the transmitting counter from the header part of the video packet Pvideo. The PLL circuit 13A generates the fixed reference clock CLKref based on the counted value Csource(t) of the transmitting counter and the clock CLKpixel for the pixel data from the PLL circuit 14, and the PLL circuit 14 reproduces the clock CLKpixel for the pixel data of the source device 1 based on the reference clock CLKref. The transmitting controller 4 of the source device 1 transmits the information Fpixel on the clock frequency for the pixel data to the sink device 110, and the receiving controller 15 of the sink device 110 sets the division parameters M and N for the PLL circuit 14 based on the information Fpixel on the clock frequency for the pixel data. In addition, the time stamp is generated by the clock CLKpixel for the pixel data, and therefore, it is possible to easily realize change in the clock frequency. In addition, by using the VCXO 24 in the PLL circuit 13, using the VCO 35 is in the PLL circuit 14, and setting the frequency division parameters M and N for the PLL circuit 14 depending on the frequency of the clock CLKpixel for the pixel data it is possible to provide the communication system which is stable with small jitter for the clock frequency changing in a wide range from several tens of megahertz to several hundreds of megahertz, and the clock synchronization method for the same communication system.

Sixth Embodiment

Figure 9:
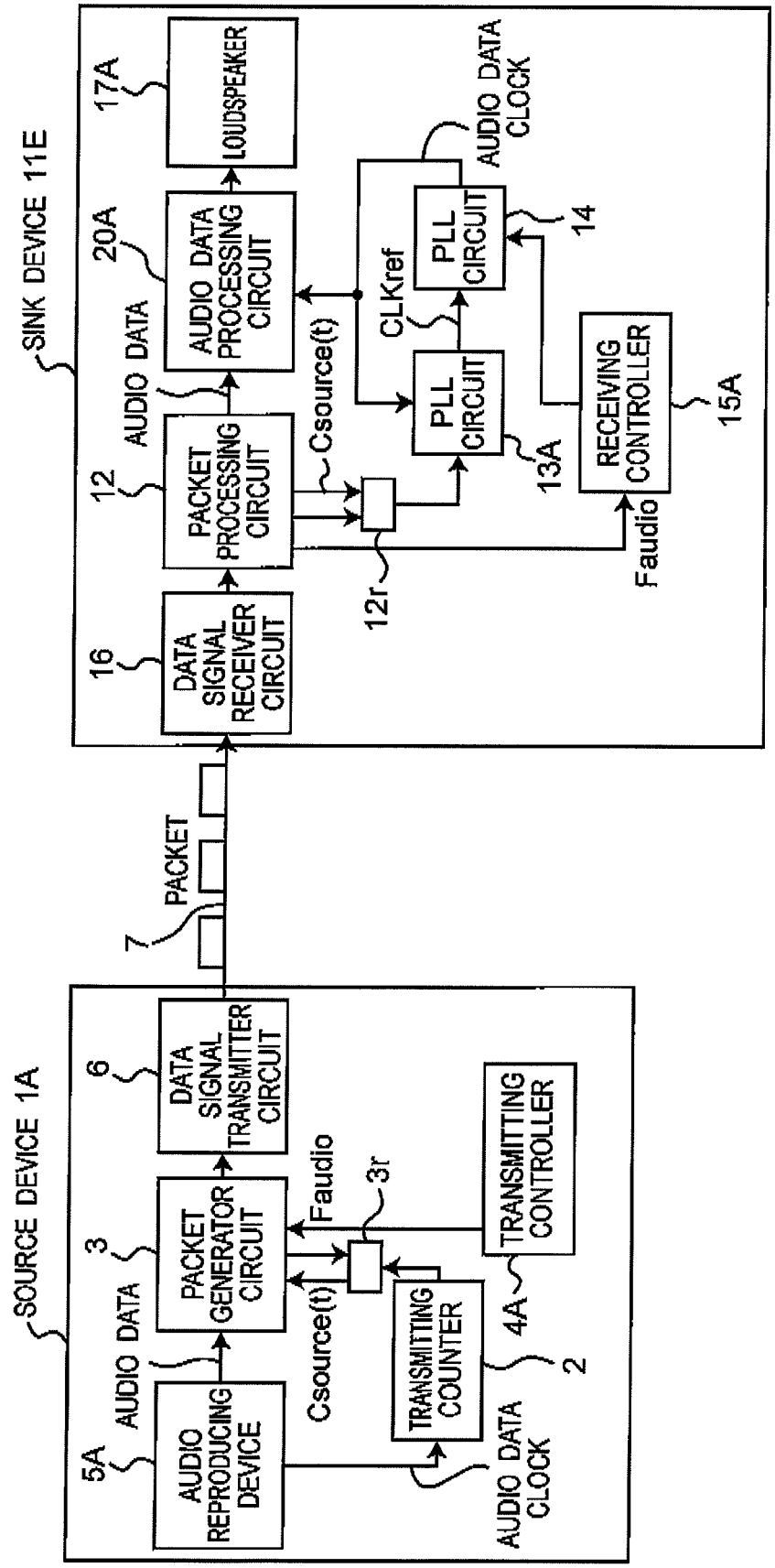
FIG. 9 is a block diagram showing a configuration of a communication system using a clock synchronization method according to a sixth embodiment of the present invention.

FIG. 9 is a block diagram showing a configuration of a communication system using a clock synchronization method according to a sixth embodiment of the present invention. The communication system of FIG. 9 is configured to include the source device 1A according to the second embodiment of FIG. 4 and a sink device 11E. In this case, the sink device 11E is configured to include the packet processing circuit 12, the register 12r, the PLL circuits 13A, 14, the receiving controller 15A, the audio data processing circuit 20A, the data signal receiver circuit 16, and the loud speaker 17A for reproducing the audio data.

The communication system according to the sixth embodiment is different from that of the second embodiment of FIG. 4 in the following respects:

(1) Instead of the PLL circuit 13, there is provided the PLL circuit 13A for generating the reference clock CLKref based on the inputted time stamp value Csource(t) and the clock CLKaudio for the audio data from the PLL circuit 14.

Referring to FIG. 2, the PLL circuit 13A, which operates in a manner similar to that of the fifth embodiment, generates the reference clock CLKref based on the inputted time stamp value Csource(t) and the clock CLKaudio for the audio data from the PLL circuit 14, and outputs the reference clock CLKref to the frequency divider 31 of the PLL circuit 14. In addition, the PLL circuit 14, which operates in a manner similar to that of the second embodiment, generates and outputs the clock CLKaudio for the audio data based on the reference clock CLKref. In addition, the receiving controller 15A sets the frequency division parameters M and N for the PLL circuit 14 based on the information Faudio on the clock frequency for the audio data in a manner similar to that of the second embodiment.

As described above, according to the present embodiment, the source device 1A counts the master clock CLKaudio for the audio data using the transmitting counter, adds the counted value Csource(t) of the transmitting counter 2 at the timing of transmitting each audio packet Paudio to the sink device 11E to the header part of the audio packet Paudio, and transmits the audio packet Paudio with the counted value Csource(t) added to the header part thereof. The sink device 11E extracts the counted value Csource(t) from the header part of the audio packet Paudio. The PLL circuit 13A generates the fixed reference clock CLKref based on the counted value Csource(t) and the master clock CLKaudio for the audio data from the PLL circuit 14, and the PLL circuit 14 reproduces the master clock CLKaudio for the audio data of the source device 1A based on the reference clock CLKref. The transmitting controller of the source device 1A transmits the information Faudio on the master clock frequency for the audio data to the sink device 11E, and the receiving controller 15A of the sink device 11E sets the division parameters M and N for the PLL circuit 14 based on the information Faudio on the clock frequency for the audio data. In addition, the time stamp is generated based on the master clock CLKaudio for the audio data, and therefore, it is possible to easily realize the change in the clock frequency. In addition, by using the VCXO 24 in the PLL circuit 13A, using the VCO 35 in the PLL circuit 14, and setting the frequency division parameters M and N for the PLL circuit 14 depending on the frequency of the clock CLKaudio for the audio data, it is possible to provide the communication system which is stable with small jitter for the clock frequency changing in a wide range from several tens of megahertz to several hundreds of megahertz, and the clock synchronization method for the same communication system.

Seventh Embodiment

Figure 10:
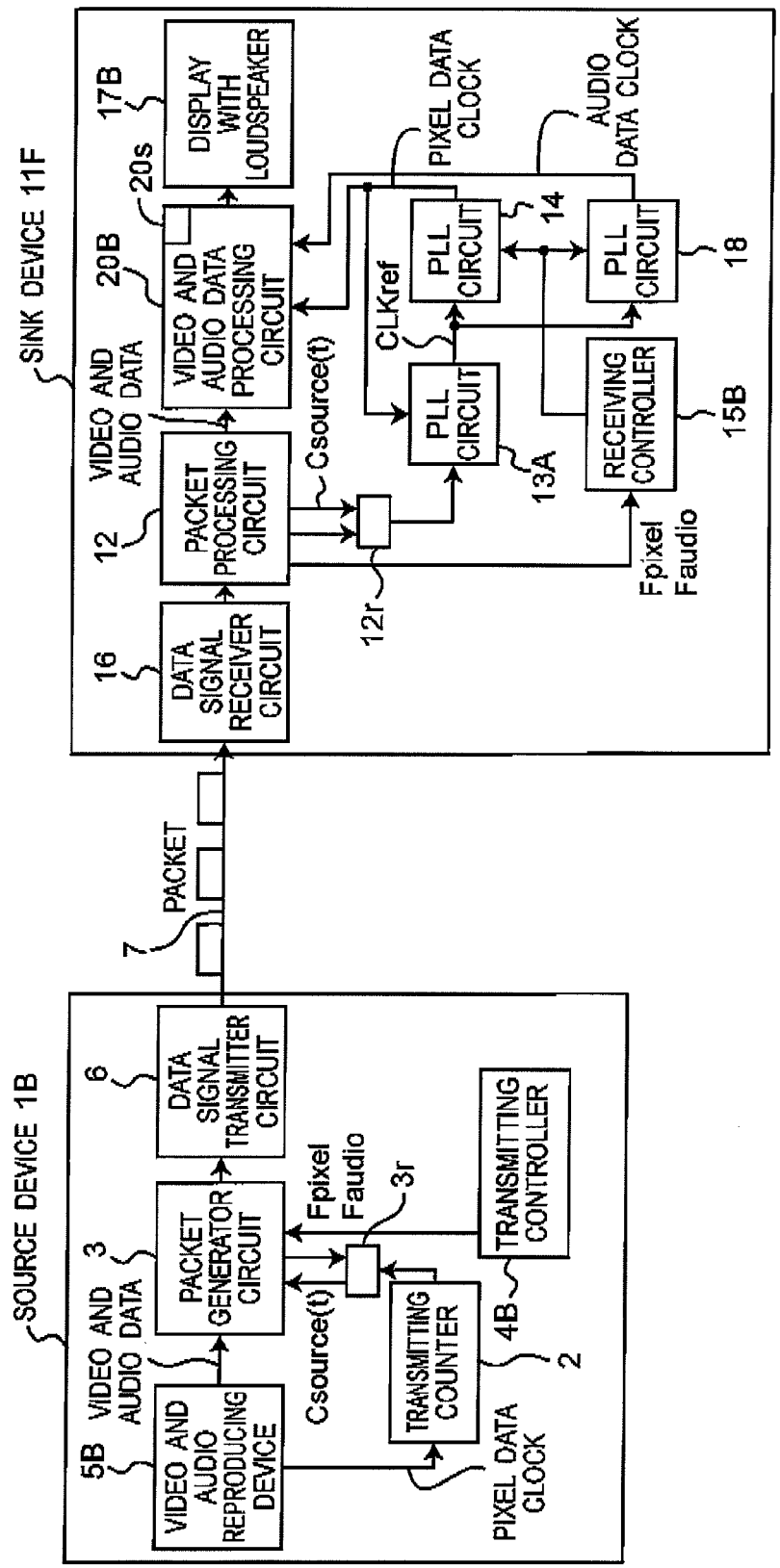
FIG. 10 is a block diagram showing a configuration of a communication system using a clock synchronization method according to a seventh embodiment of the present invention.

FIG. 10 is a block diagram showing a configuration of a communication system using a clock synchronization method according to a seventh embodiment of the present invention. The communication system of FIG. 10 is configured to include the source device 1B according to the third embodiment of FIG. 5 and a sink device 11F. In this case, the sink device 11F is configured to include the packet processing circuit 12, the register 12r, the PLL circuits 13A, 14 and 18, the receiving controller 153, the data signal receiver circuit 16, the video and audio data processing circuit 20B including the control signal generator 20s, and the display 17B with the loudspeaker for reproducing video data and audio data.

The communication system according to the seventh embodiment is different from that of the third embodiment of FIG. 5 in the following respects:

(1) In stead of the PLL circuit 13, there is provided the communication system includes the PLL circuit 13A for generating the reference clock CLKref based on the inputted time stamp value Csource(t) and the clock CLKpixel for pixel data from the PLL circuit 14.

Referring to FIG. 10, the PLL circuit 13A, which operates in a manner similar to that of the fifth embodiment, generates the reference clock CLKref based on the inputted time stamp value Csource(t) and the clock CLKpixel for the pixel data from the PLL circuit 14, and outputs the reference clock CLKref to the PLL circuits 14 and 18. The PLL circuit 14, which operates in a manner similar to that of the third embodiment, generates and outputs the clock CLKpixel for the pixel data based on the reference clock CLKref. Further, the PLL circuit 18, which operates in a manner similar to that of the third embodiment, generates and outputs the clock CLKaudio for the audio data based on the reference clock CLKref. In addition, the receiving controller 153 sets the frequency division parameters M and N for the PLL circuits 14 and 18 based on the information Fpixel on the clock frequency for the pixel data and the information Faudio on the clock frequency for the audio data in a manner similar to that of the third embodiment.

As described above, according to the present embodiment, the source device 1B counts the clock CLKpixel for the pixel data using the transmitting counter 2, adds the counted value Csource(t) of the transmitting counter 2 at the timing of transmitting each mixture packet Pav including the video data and the audio data to the sink device 11P to the header part of the packet Pav, and transmits the packet Pav with the counted value Csource(t) added to the header part thereof. The sink device 11F extracts the time stamp value Csource(t) froth the header part of the mixture packet Pav including the video data and the audio data. The PLL circuit 13A generates the fixed reference clock CLKref based on the time stamp value Csource(t) and the clock CLKpixel for the pixel data from the PLL circuit 14. The PLL circuit 14 reproduces and outputs the clock CLKpixel for the pixel data of the source device 1B based on the reference clock CLKref. The PLL circuit 18 reproduces and outputs the clock CLKaudio for the audio data of the source device 1B based on the reference clock CLKref. The transmitting controller 4B of the source device 13 transmits the information Fpixel on the frequency of the clock for the pixel data and the information Faudio on the frequency of the master clock for the audio data to the sink device 11F via the packet generator circuit 3 and the data signal transmitter circuit 6. The receiving controller 153 of the sink device 11F sets the division parameters M and N for the PLL circuits 14 and 18 based on the received information Fpixel on the clock frequency for the pixel data and the received information Faudio on the clock frequency for the audio data. In addition, the time stamp value is generated based on the clock CLKpixel for the pixel data, and therefore, it is possible to easily realize the change in the clock frequency. By using the VCXO 24 in the PLL circuit 13A, using the VCO 35 in each of the PLL circuits 14 and 18, and setting the frequency division parameters M and N for the PLL circuits 14 and 18 depending on the frequency of the clock CLKpixel for the image data and the master clock CLKaudio for the audio data, it is possible to provide the communication system which is stable with small jitter for the clock frequencies for both of the information Fpixel on the clock frequency for the pixel data and the information Faudio on the master clock frequency for the audio data each changing in a wide range from several tens of megahertz to several hundreds of megahertz, and the clock synchronization method for the same communication system.

Eighth Embodiment

Figure 11:
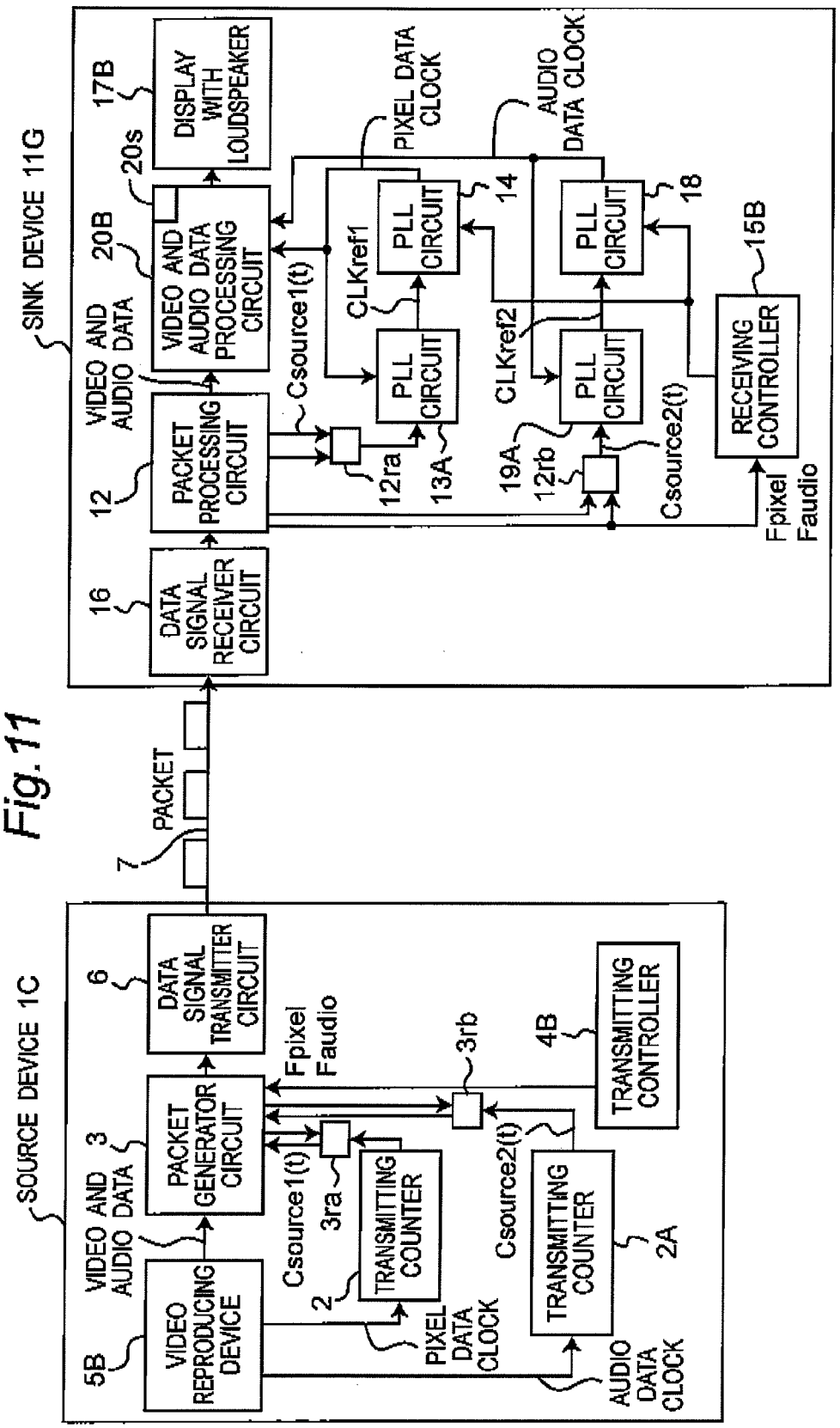
FIG. 11 is a block diagram showing a configuration of a communication system using a clock synchronization method according to an eighth embodiment of the present invention.
Figure 12:
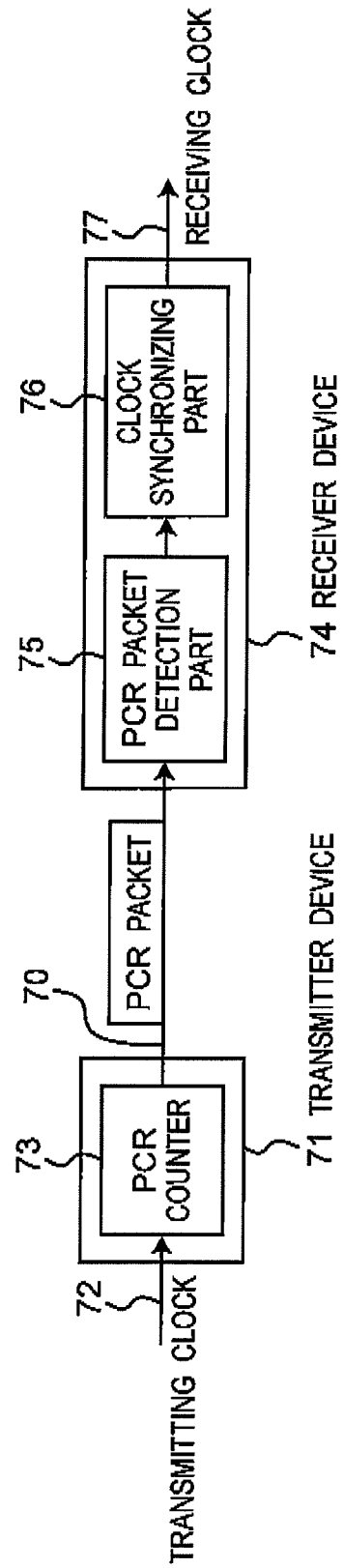
FIG. 12 is a block diagram showing a configuration of a communication system using a clock synchronization method according to a prior art.

FIG. 11 is a block diagram showing a configuration of a communication system using a clock synchronization method according to an eighth embodiment of the present invention. The communication system of FIG. 11 is configured to include the source device 1C according to the fourth embodiment of FIG. 6 and a sink device 11G. Referring to FIG. 11, the sink device 110 is configured to include the packet processing circuit 12, the registers 12ra and 12rb, PLL circuits 13A, 14, 18 and 19A, the receiving controller 15B, the data signal receiver circuit 16, the video and audio data processing circuit 20B including the control signal generator 20s, and the display 17B with the loudspeaker for reproducing the video data and audio data.

The communication system according to the eighth embodiment is different from that of the third embodiment of FIG. 6 in the following respects:

(1) In stead of the PLL circuit 13, there is provided the PLL circuit 13A for generating the reference clock CLKref1 based on the inputted time stamp value Csource1(t) and the clock CLKpixel for the pixel data from the PLL circuit 14.

(2) In stead of the PLL circuit 19, there is provided the PLL circuit 19A for generating the reference clock CLKref2 based on the inputted time stamp value Csource2(t) and the clock CLKaudio for the audio data from the PLL circuit 18.

Referring to FIG. 11, the PLL circuit 13A, which operates in a manner similar to that of the PLL circuit 13A according to the fifth embodiment, generates the reference clock CLKref1 based on the time stamp value Csource1(t) and the clock CLKpixel for the pixel data from the PLL circuit 14, and outputs the reference clock CLKref1 to the PLL circuit 14. The PLL circuit 14, which operates in a manner similar to that of the PLL circuit 14 according to the fourth embodiment, generates and outputs the clock CLKpixel for the pixel data based on the reference clock CLKref1. Further, the PLL circuit 19A, which operates in a manner similar to that of the PLL circuit 13A according to the fifth embodiment, generates the reference clock CLKref2 based on the time stamp value Csource2(t) and the clock CLKaudio for the audio data from the PLL circuit 18, and outputs the reference clock CLKref2 to the PLL circuit 18. The PLL circuit 19, which operates in a manner similar to that of the PLL circuit 19 according to the fourth embodiment, generates and outputs the clock CLKaudio for the audio data based on the reference clock CLKref2. In addition, the receiving controller 15B sets the frequency division parameters M and N for the PLL circuits 14 and 18 based on the information Fpixel on the clock frequency for the pixel data and the information Faudio on the clock frequency for the audio data in a manner similar to that of the fourth embodiment.

As described above, according to the present embodiment, the source device 1C counts the clock CLKpixel for the pixel data using the transmitting counter 2, counts the master clock CLKaudio for the audio data using the transmitting counter 2A, adds one of the counted value Csource1(t) of the transmitting counter 2 and the counted value Csource2(t) of the transmitting counter 2A at the timing of transmitting each mixture packet Pav including the video data and the audio data to the sink device 11G to the header part of the packet Pav, and transmits the packet Pav to the sink device 11G. The sink device 110 extracts the time stamp values Csource1(t) and Csource2(t) from the header part of the packet Pav, and outputs the time stamp values Csource1(t) and Csource2(t) to the PLL circuits 13 and 19A via the registers 12a and 12b, respectively. The PLL circuit 13A generates the fixed reference clock CLKref1 based on the time stamp value Csource1(t), and the PLL circuit 19A generates the fixed reference clock CLKref2 based on the time stamp value Csource2(t). The PLL circuit 14 reproduces and outputs the clock CLKpixel for the pixel data of the source device 1C based on the reference clock CLKref1, and the PLL circuit 18 reproduces and outputs the master clock CLKaudio for the audio data of the source device 110 based on the reference clock CLKref2. Further, the transmitting controller 4B of the source device 110 transmits the information Fpixel on the clock frequency for the pixel data and the information Faudio on the master clock frequency for the audio data to the sink device 11G via the packet generator circuit 3 and the data signal transmitter circuit 6. The receiving controller 15B of the sink device 110 sets the division parameters M and N for the PLL circuits 14 and 18 based on the information Fpixel on the clock frequency for the pixel data and the information Faudio on the master clock frequency for the audio data. In addition, the time stamp values are generated based on the clock CLKpixel for the pixel data and the master clock CLKaudio for the audio data, and therefore, it is possible to easily realize the change in the clock frequency. In addition, by using the VCXO 24 in each of the PLL circuits 13A and 19A, using the VCO 35 in each of the PLL circuits 14 and 18, and setting the frequency division parameters M and N for the PLL circuits 14 and 18 depending on the frequency of the clock CLKpixel for the pixel data and the frequency of the master clock CLKaudio for the audio data, it is possible to provide the communication system which is stable with small jitter for the clock frequency changing in a wide range from several tens of megahertz to several hundreds of megahertz, and the clock synchronization method for the same communication system, even when the information Fpixel on the clock frequency for the pixel data is asynchronous with the information Faudio on the clock frequency for the audio data.

In the embodiments described above, each of the PLL circuits 13 and 19 is configured to include the subtracter 21, the filter 22, the D/A converter 23, the VCXO 24, the receiving counter 25 and the multipliers 27 as shown in FIG. 2. However, the present invention is not limited to this, and the PLL circuits 13 and 19 may be other PLL circuits each configured to include a VCXO and configured in a manner different from that of FIG. 2.

In the embodiments stated so far, each of the PLL circuits 14 and 18 is configured to include the frequency dividers 31 and 32, the phase comparator 33, the LPF 34, the VCO 35 and the counter 36 as shown in FIG. 3. However, the present invention is not limited to this, and the PLL circuits 14 and 18 may be other PLL circuits each configured to include a VCO and configured in a manner different from that of FIG. 3.

INDUSTRIAL APPLICABILITY

As described above, according to the communication system and the clock synchronization method therefor according to the present invention, the source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device. The sink device extracts the time stamp value Csource(t) from the header part of the video packet Pvideo, generates a fixed reference clock CLKref based on the counted value Csource(t) using a first PLL circuit, and generates the clock CLKpixel for the pixel data of the source device based on the reference clock CLKref using a second PLL circuit. The source device transmits information Fpixel on a clock frequency for the pixel data to the sink device. The sink device sets the division parameters for the first PLL circuit and the second PLL circuit based on the information Fpixel on the clock frequency for the pixel data, and generates the time stamp by the clock CLKpixel for the pixel data. Therefore, it is possible to easily realize change in the clock frequency. In addition, for example, by using the VCXO in the first PLL circuit, using the VCO is in the second PLL circuit, and setting the frequency division parameters for the first and second PLL circuits depending on the frequency of the clock CLKpixel for the pixel data, it is possible to provide the communication system which is stable with small jitter for the clock frequency changing in a wide range from several tens of megahertz to several hundreds of megahertz, and the clock synchronization method for the communication system.

The invention claimed is:

1. A communication system comprising a source device and a sink device connected to each other via a communication line,
   wherein the source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device, and
   wherein the sink device receives the video packet Pvideo, extracts the time stamp value Csource(t) from the header part of the video packet Pvideo, generates a fixed reference clock CLKref with a predetermined first frequency division parameter based on the counted value Csource(t) of the transmitting counter using a first PLL circuit, and generates the clock CLKpixel for the pixel data of the source device with a predetermined second frequency division parameter based on the reference clock CLKref using a second PLL circuit.

2. The communication system as claimed in claim 1,
   wherein the source device transmits information Fpixel on a clock frequency for the pixel data to the sink device, and
   wherein the sink device sets the first frequency division parameter for the first PLL circuit and the second frequency division parameter for the second PLL circuit based on the information Fpixel on the clock frequency for the pixel data.

3. The communication system as claimed in claim 1,
   wherein the first PLL circuit comprises:
   a first multiplier for multiplying the counted value Csource(t) of the transmitting counter by a predetermined first multiplier factor, and outputting a signal of a multiplication result;
   a subtracter for calculating a differential value between the signal of the multiplication result outputted from the first multiplier and a signal of a multiplication result outputted from a second multiplier, and outputting a differential signal representing the differential value;
   a filter for smoothing the differential signal outputted from the subtracter, and outputting a smoothed differential signal;
   a D/A converter for converting the smoothed differential signal outputted from the filter into an analog signal;
   a voltage-controlled crystal oscillator controlled by the analog signal outputted from the D/A converter, the voltage-controlled crystal oscillator generating and outputting the reference clock CLKref;
   a receiving counter for counting the reference clock CLKref outputted from the voltage-controlled crystal oscillator, and outputting a signal of a counted value; and
   the second multiplier for multiplying the signal of the counted value outputted from the receiving counter by a predetermined second multiplier factor, and outputting the signal of the multiplication result to the subtracter.

4. The communication system as claimed in claim 1, wherein the second PLL circuit comprises:
a first frequency divider for dividing a frequency of an inputted reference clock CLKref by a predetermined first division ratio, and outputting a first frequency-divided clock;
a phase comparator for comparing a phase of the first frequency-divided clock outputted from the first frequency divider with a phase of a second frequency-divided clock outputted from a second frequency divider, and outputting an error signal of a phase comparison result;
a low-pass filter for smoothing the error signal outputted from the phase comparator, and outputting a smoothed error signal;
a voltage-controlled oscillator controlled by the smoothed error signal outputted from the low-pass filter, the voltage-controlled oscillator generating an oscillating signal and outputting the oscillating signal as the clock CLKpixel for the pixel data; and
the second frequency divider for dividing a frequency of the clock CLKpixel for the pixel data outputted from the voltage-controlled oscillator by a predetermined second division ratio, and outputting the second frequency-divided clock.

5. A communication system comprising a source device and a sink device connected to each other via a communication line,
wherein the source device counts a clock CLKaudio for audio data using a transmitting counter, adds a counted value Csource(t) of the transmitting counter at a timing of transmitting an audio packet Paudio to the sink device, to a header part of the audio packet Pvideo as a time stamp value, and transmits the audio packet Paudio to the sink device, and
wherein the sink device receives the audio packet Paudio, extracts the time stamp value Csource(t) from the header part of the audio packet Paudio, generates a fixed reference clock CLKref based on the time stamp value Csource(t) using a first PLL circuit, and generates the clock CLKaudio for the audio data of the source device based on the reference clock CLKref using a second PLL circuit.

6. The communication system as claimed in claim 5, wherein the source device transmits information Faudio on a clock frequency for the audio data to the sink device, and
wherein the sink device sets a first frequency division parameter for the first PLL circuit and a second frequency division parameter for the second PLL circuit based on the information Faudio on the clock frequency for the audio data.

7. A communication system comprising a source device and a sink device connected to each other via a communication line,
wherein the source device counts a clock CLKpixel for pixel data using a transmitting counter, adds a counted value Csource(t) of the transmitting counter at a timing of transmitting a mixture packet Pav including video data and audio data to the sink device, to a header part of the mixture packet Pav as a time stamp value, and transmits the packet Pav to the sink device, and
wherein the sink device receives the mixture packet Pav, extracts the time stamp value Csource(t) from the header part of the mixture packet Pav, generates a fixed reference clock CLKref based on the time stamp value Csource(t) using a first PLL circuit, generates the clock CLKpixel for the pixel data of the source device based on the reference clock CLKref using a second PLL circuit, and generates the reference clock CLKaudio for the audio data of the source device based on the reference clock CLKref2 using a third PLL circuit.

8. A communication system comprising a source device and a sink device connected to each other via a communication line,
wherein the source device counts a clock CLKpixel for pixel data using a first transmitting counter, counts a reference clock CLKaudio for audio data using a second transmitting counter, adds a counted value Csource1($t$) of the first transmitting counter and a counted value Csource2($t$) of the second transmitting counter at a timing of transmitting a mixture packet Pav including video data and audio data to the sink device, to a header part of the mixture packet Pav as time stamp values, and transmits the packet Pav to the sink device, and
wherein the sink device receives the mixture packet Pav, extracts the time stamp value Csource1($t$) and the time stamp value Csource2($t$) from the header part of the mixture packet Pav, generates a fixed reference clock CLKref1 based on the time stamp value Csource1($t$) using a first PLL circuit, generates the clock CLKpixel for the pixel data of the source device based on the reference clock CLKref1 using a second PLL circuit, generates a fixed reference clock CLKref2 based on the time stamp value Csource2($t$) using a fourth PLL circuit, and generates the reference clock CLKaudio for the audio data of the source device based on the reference clock CLKref2 using a third PLL circuit.

9. A clock synchronization method for a communication system comprising a source device and a sink device connected to each other via a communication line,
wherein the source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device, and
wherein the sink device receives the video packet Pvideo, extracts the time stamp value Csource(t) from the header part of the video packet Pvideo, generates a fixed reference clock CLKref with a predetermined first frequency division parameter based on the counted value Csource(t) of the transmitting counter using a first PLL circuit, and generates the clock CLKpixel for the pixel data of the source device with a predetermined second frequency division parameter based on the reference clock CLKref using a second PLL circuit.

10. The clock synchronization method for the communication system as claimed in claim 9,
wherein the source device transmits information Fpixel on a clock frequency for the pixel data to the sink device, and
wherein the sink device sets the first frequency division parameter for the first PLL circuit and the second frequency division parameter for the second PLL circuit based on the information Fpixel on the clock frequency for the pixel data.

11. The clock synchronization method for the communication system as claimed in claim 9,
wherein the first PLL circuit operates as follows:
a first multiplier for multiplying the counted value Csource(t) of the transmitting counter by a predetermined first multiplier factor, and outputting a signal of a multiplication result;
using a subtracter, calculates a differential value between the signal of the multiplication result outputted from the first multiplier and a signal of a multiplication result outputted from a second multiplier, and outputs a differential signal representing the differential value;
using a filter, smoothes the differential signal outputted from the subtracter, and outputs a smoothed differential signal;
using a D/A converter, converts the smoothed differential signal outputted from the filter into an analog signal;
using a voltage-controlled crystal oscillator controlled by the analog signal outputted from the D/A converter, generates and outputs the reference clock CLKref;
using a receiving counter, counts the reference clock CLKref outputted from the voltage-controlled crystal oscillator, and outputs a signal of a counted value; and
using the second multiplier, multiplies the signal of the counted value outputted from the receiving counter by a predetermined second multiplier factor, and outputs the signal of the multiplication result to the subtracter.

12. The clock synchronization method for the communication system as claimed in claim 9,
wherein the second PLL circuit operates as follows:
using a first frequency divider, divides a frequency of an inputted reference clock CLKref by a predetermined first division ratio, and outputs a first frequency-divided clock;
using a phase comparator, compares a phase of the first frequency-divided clock outputted from the first frequency divider with a phase of a second frequency-divided clock outputted from a second frequency divider, and outputs an error signal of a phase comparison result;
using a low-pass filter, smoothes the error signal outputted from the phase comparator, and outputs a smoothed error signal;
using a voltage-controlled oscillator controlled by the smoothed error signal outputted from the low-pass filter, generates an oscillating signal and outputs the oscillating signal as the clock CLKpixel for the pixel data; and
using the second frequency divider, divides a frequency of the clock CLKpixel for the pixel data outputted from the voltage-controlled oscillator by a predetermined second division ratio, and outputs the second frequency-divided clock.

13. A clock synchronization method for a communication system comprising a source device and a sink device connected to each other via a Communication line,
wherein the source device counts a clock CLKaudio for audio data using a transmitting counter, adds a counted value Csource(t) of the transmitting counter at a timing of transmitting an audio packet Paudio to the sink device, to a header part of the audio packet Pvideo as a time stamp value, and transmits the audio packet Paudio to the sink device, and
wherein the sink device receives the audio packet Paudio, extracts the time stamp value Csource(t) from the header part of the audio packet Paudio, generates a fixed reference clock CLKref based on the time stamp value Csource(t) using a first PLL circuit, and generates the clock CLKaudio for the audio data of the source device based on the reference clock CLKref using a second PLL circuit.

14. The clock synchronization method for the communication system as claimed in claim 13,
wherein the source device transmits information Faudio on a clock frequency for the audio data to the sink device, and
wherein the sink device sets a first frequency division parameter for the first PLL circuit and a second frequency division parameter for the second PLL circuit based on the information Faudio on the clock frequency for the audio data.

15. A clock synchronization method for a communication system comprising a source device and a sink device connected to each other via a communication line,
wherein the source device counts a clock CLKpixel for pixel data using a transmitting counter, adds a counted value Csource(t) of the transmitting counter at a timing of transmitting a mixture packet Pav including video data and audio data to the sink device, to a header part of the mixture packet Pav as a time stamp value, and transmits the packet Pav to the sink device, and
wherein the sink device receives the mixture packet Pav, extracts the time stamp value Csource(t) from the header part of the mixture packet Pav, generates a fixed reference clock CLKref based on the time stamp value Csource(t) using a first PLL circuit, generates the clock CLKpixel for the pixel data of the source device based on the reference clock CLKref using a second PLL circuit, and generates the reference clock CLKaudio for the audio data of the source device based on the reference clock CLKref2 using a third PLL circuit.

16. A clock synchronization method for a communication system comprising a source device and a sink device connected to each other via a communication line,
wherein the source device counts a clock CLKpixel for pixel data using a first transmitting counter, counts a reference clock CLKaudio for audio data using a second transmitting counter, adds a counted value Csource1(t) of the first transmitting counter and a counted value Csource2(t) of the second transmitting counter at a timing of transmitting a mixture packet Pav including video data and audio data to the sink device, to a header part of the mixture packet Pav as time stamp values, and transmits the packet Pav to the sink device, and
wherein the sink device receives the mixture packet Pav, extracts the time stamp value Csource1(t) and the time stamp value Csource2(t) from the header part of the mixture packet Pav, generates a fixed reference clock CLKref1 based on the time stamp value Csource1(t) using a first PLL circuit, generates the clock CLKpixel for the pixel data of the source device based on the reference clock CLKref1 using a second PLL circuit, generates a fixed reference clock CLKref2 based on the time stamp value Csource2(t) using a fourth PLL circuit, and generates the reference clock CLKaudio for the audio data of the source device based on the reference clock CLKref2 using a third PLL circuit.

17. A communication system comprising a source device and a sink device connected to each other via a communication line,
wherein the source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device, and wherein the sink device receives the video packet Pvideo, extracts the time stamp value Csource(t) from the header part of the video packet Pvideo, generates a fixed reference clock CLKref based on the counted value Csource (t) of the transmitting counter and the clock CLKpixel for the pixel data generated by a second PLL circuit using a first PLL circuit, and generates the clock CLKpixel for the pixel data of the source device with a predetermined second frequency division parameter based on the reference clock CLKref using the second PLL circuit.

18. The communication system as claimed in claim 17, wherein the source device transmits information Fpixel on a clock frequency for the pixel data to the sink device, and wherein the sink device sets the second frequency division parameter for the second PLL circuit based on the information Fpixel on the clock frequency for the pixel data.

19. The communication system as claimed in claim 17, wherein the first PLL circuit comprises:

a subtracter for calculating a differential value between the counted value Csource(t) of the transmitting counter and a signal outputted from a receiving counter, and outputting a differential signal representing the differential value;

a filter for smoothing the differential signal outputted from the subtracter, and outputting a smoothed differential signal;

a D/A converter for converting the smoothed differential signal outputted from the filter into an analog signal;

a voltage-controlled crystal oscillator controlled by the analog signal outputted from the D/A converter, the voltage-controlled crystal oscillator generating and outputting the reference clock CLKref; and the receiving counter for counting the inputted clock CLKpixel for the pixel data, and outputting a signal of a counted value.

20. The communication system as claimed in claim 17, wherein the second PLL circuit comprises:

a first frequency divider for dividing a frequency of an inputted reference clock CLKref by a predetermined first division ratio, and outputting a first frequency-divided clock;

a phase comparator for comparing a phase of the first frequency-divided clock outputted from the first frequency divider with a phase of a second frequency-divided clock outputted from a second frequency divider, and outputting an error signal of a phase comparison result;

a low-pass filter for smoothing the error signal outputted from the phase comparator, and outputting a smoothed error signal;

a voltage-controlled oscillator controlled by the smoothed error signal outputted from the low-pass filter, the voltage-controlled oscillator generating an oscillating signal and outputting the oscillating signal as the clock CLKpixel for the pixel data; and the second frequency divider for dividing a frequency of the clock CLKpixel for the pixel data outputted from the voltage-controlled oscillator by a predetermined second division ratio, and outputting the second frequency-divided clock.

21. A clock synchronization method for a communication system comprising a source device and a sink device connected to each other via a communication line, wherein the source device counts a clock CLKpixel for pixel data using a transmitting counter, adds a counted value Csource(t) of the transmitting counter at a timing of transmitting a video packet Pvideo to the sink device, to a header part of the video packet Pvideo as a time stamp value, and transmits the video packet Pvideo to the sink device, and wherein the sink device receives the video packet Pvideo, extracts the time stamp value Csource(t) from the header part of the video packet Pvideo, generates a fixed reference clock CLKref based on the counted value Csource (t) of the transmitting counter and the clock CLKpixel for the pixel data generated by a second PLL circuit using a first PLL circuit, and generates the clock CLKpixel for the pixel data of the source device with a predetermined second frequency division parameter based on the reference clock CLKref using the second PLL circuit.

22. The clock synchronization method for the communication system as claimed in claim 21, wherein the source device transmits information Fpixel on a clock frequency for the pixel data to the sink device, and wherein the sink device sets the second frequency division parameter for the second PLL circuit based on the information Fpixel on the clock frequency for the pixel data.

23. The clock synchronization method for the communication system as claimed in claim 21, wherein the first PLL circuit operates as follows:

using a subtracter, calculates a differential value between the counted value Csource(t) of the transmitting counter and a signal outputted from a receiving counter, and outputs a differential signal representing the differential value;

using a filter, smoothes the differential signal outputted from the subtracter, and outputs a smoothed differential signal;

using a D/A converter, converts the smoothed differential signal outputted from the filter into an analog signal;

using a voltage-controlled crystal oscillator controlled by the analog signal outputted from the D/A converter, generates and outputs the reference clock CLKref; and using the receiving counter, counts the inputted clock CLKpixel for the pixel data, and outputs a signal of a counted value.

24. The clock synchronization method for the communication system as claimed in claim 21, wherein the second PLL circuit operates as follows:

using a first frequency divider, divides a frequency of an inputted reference clock CLKref by a predetermined first division ratio, and outputs a first frequency-divided clock;

using a phase comparator, compares a phase of the first frequency-divided clock outputted from the first frequency divider with a phase of a second frequency-divided clock outputted from a second frequency divider, and outputs an error signal of a phase comparison result;

using a low-pass filter, smoothes the error signal outputted from the phase comparator, and outputs a smoothed error signal;

using a voltage-controlled oscillator controlled by the smoothed error signal outputted from the low-pass filter, generates an oscillating signal and outputs the oscillating signal as the clock CLKpixel for the pixel data; and
using the second frequency divider, divides a frequency of the clock CLKpixel for the pixel data outputted from the voltage-controlled oscillator by a predetermined second division ratio, and outputs the second frequency-divided clock.

* * * * *